US010666905B2

(12) United States Patent
Ishiyama et al.

(10) Patent No.: US 10,666,905 B2
(45) Date of Patent: *May 26, 2020

(54) VERIFICATION METHOD, VERIFICATION SYSTEM, VERIFICATION APPARATUS, AND PROGRAM THEREFOR

(71) Applicant: NEC Corporation, Tokyo (JP)

(72) Inventors: Rui Ishiyama, Tokyo (JP); Toru Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 428 days.

This patent is subject to a terminal disclaimer.

(21) Appl. No.: 14/409,868

(22) PCT Filed: Jun. 21, 2013

(86) PCT No.: PCT/JP2013/067123
§ 371 (c)(1),
(2) Date: Dec. 19, 2014

(87) PCT Pub. No.: WO2013/191281
PCT Pub. Date: Dec. 27, 2013

(65) Prior Publication Data
US 2015/0189238 A1 Jul. 2, 2015

(30) Foreign Application Priority Data

Jun. 22, 2012 (JP) .................. 2012-140355

(51) Int. Cl.
*H04N 9/47* (2006.01)
*H04N 7/18* (2006.01)
(Continued)

(52) U.S. Cl.
CPC .......... *H04N 7/18* (2013.01); *G06K 9/00577* (2013.01); *G06K 9/46* (2013.01); *G06K 9/52* (2013.01);
(Continued)

(58) Field of Classification Search
CPC ........ H04N 7/18; G06K 9/46; G06K 9/00577; G06K 9/00771; G06K 9/2036;
(Continued)

(56) References Cited

U.S. PATENT DOCUMENTS 6,005,960 A 12/1999 Moore
7,634,455 B1 12/2009 Keene et al.
(Continued)

FOREIGN PATENT DOCUMENTS

EP 2214133 A1 8/2010
JP 2002-125721 A 5/2002
(Continued)

OTHER PUBLICATIONS

Extended European Search Report issued by the European Patent Office for Application No. 13806465.4 dated Mar. 14, 2016 (9 pages).

(Continued)

*Primary Examiner* — Masum Billah
(74) *Attorney, Agent, or Firm* — Wilmer Cutler Pickering Hale and Dorr LLP

(57) ABSTRACT

The present invention addresses the problem of providing technology that makes it possible to perform verification for the purposes of distribution management, authenticity assessment, and the like of merchandise without building an RFID chip into each of a plurality of fasteners. The present invention is characterized in that image characteristics of a component of a product to be verified are acquired and the product to be verified is verified on the basis of the acquired image characteristics of the component.

16 Claims, 13 Drawing Sheets

(51) Int. Cl.
  *G06Q 50/04* (2012.01)
  *G06Q 10/08* (2012.01)
  *G06K 9/00* (2006.01)
  *G06K 9/46* (2006.01)
  *G06K 9/52* (2006.01)
  *G06T 7/40* (2017.01)

(52) U.S. Cl.
  CPC ............ *G06Q 10/08* (2013.01); *G06Q 50/04* (2013.01); *G06T 7/40* (2013.01); *G06K 2009/4666* (2013.01); *Y02P 90/30* (2015.11)

(58) Field of Classification Search
  CPC ....... G06K 2009/00583; G06K 9/6267; G06K 2009/4666; G06K 9/52; G06Q 10/08; G06Q 20/40
  USPC .......................................................... 348/86
  See application file for complete search history.

(56) References Cited

U.S. PATENT DOCUMENTS

| | | | |
|---|---|---|---|
| 2004/0049294 A1 | 3/2004 | Keene et al. | |
| 2005/0174845 A1 | 8/2005 | Koyama et al. | |
| 2008/0152231 A1* | 6/2008 | Gokturk | G06F 17/30256 382/209 |
| 2008/0219503 A1* | 9/2008 | Di Venuto | G06K 9/00577 382/103 |
| 2009/0080760 A1 | 3/2009 | Knysh et al. | |
| 2009/0089175 A1* | 4/2009 | Platek | G06Q 10/08 705/26.1 |
| 2009/0284310 A1 | 11/2009 | Koyama et al. | |
| 2011/0220725 A1 | 9/2011 | Koyama et al. | |
| 2011/0283369 A1 | 11/2011 | Green | |
| 2012/0043648 A1 | 2/2012 | Matsumaru et al. | |
| 2012/0191566 A1* | 7/2012 | Sayan | G06Q 30/0601 705/26.8 |
| 2014/0337105 A1 | 11/2014 | Platek et al. | |

FOREIGN PATENT DOCUMENTS

| | | | |
|---|---|---|---|
| JP | 2005-251183 A | | 9/2005 |
| JP | 2006-146570 A | | 6/2006 |
| JP | 2008-102676 A | | 5/2008 |
| JP | 2009-187580 A | | 8/2009 |
| JP | 2009187580 A | * | 8/2009 |
| JP | 2010055391 A | * | 3/2010 |
| JP | 2011-048710 A | | 3/2011 |
| JP | 2012-043953 | | 3/2012 |
| KR | 10-2011-0102700 A | | 9/2011 |
| WO | WO-2007/028799 A1 | | 3/2007 |
| WO | WO-2009/044826 A1 | | 4/2009 |
| WO | WO-2009/115611 A2 | | 9/2009 |

OTHER PUBLICATIONS

International Search Report corresponding to PCT/JP2013/067123 dated Aug. 27, 2013 (2 pages).
Korean Office Action issued in corresponding Korean Application No. 10-2015-7001747, dated Feb. 5, 2016, 12 pages.
Japanese Office Action issued by the Japan Patent Office for Japanese Application No. 2014-521525 dated Jul. 12, 2017 (7 pages)—Japanese language.
European Office Action issued by the European Patent Office for European Application No. 13806465.4 dated Feb. 21, 2018 (6 pages).
Korean Notification of Reason for Refusal issued in Korean Patent Application No. 10-2018-7023343, dated Nov. 7, 2018, 15 pages.
Decision to Grant a Patent issued by the Japan Patent Office for Japanese Application No. 2014-521525 dated Aug. 22, 2018 (6 pages).
European Communication of Notices of Opposition (R.79(1) EPC) issued in European Patent Application No. 13806465.4, dated Mar. 26, 2020, 45 pages.
Anteleon Imaging Systems "Anteleon Imaging sàrl Company Presentation UNITEC Course", University of Geneva, May 27, 2009, pp. 1-16 (16 pages).
M.T. Ozsu, et al. "Principles of Distributed Database Systems", Third Edition, by M. Tamer Ozsu et al., DOI 10.1007/978-1-4419-8834-8_11, Springer Science & Business Medial, LLC 2011, ISBN 978-4419-8833-1, pp. 1-845 (874 pages).

* cited by examiner

PULL-TAB

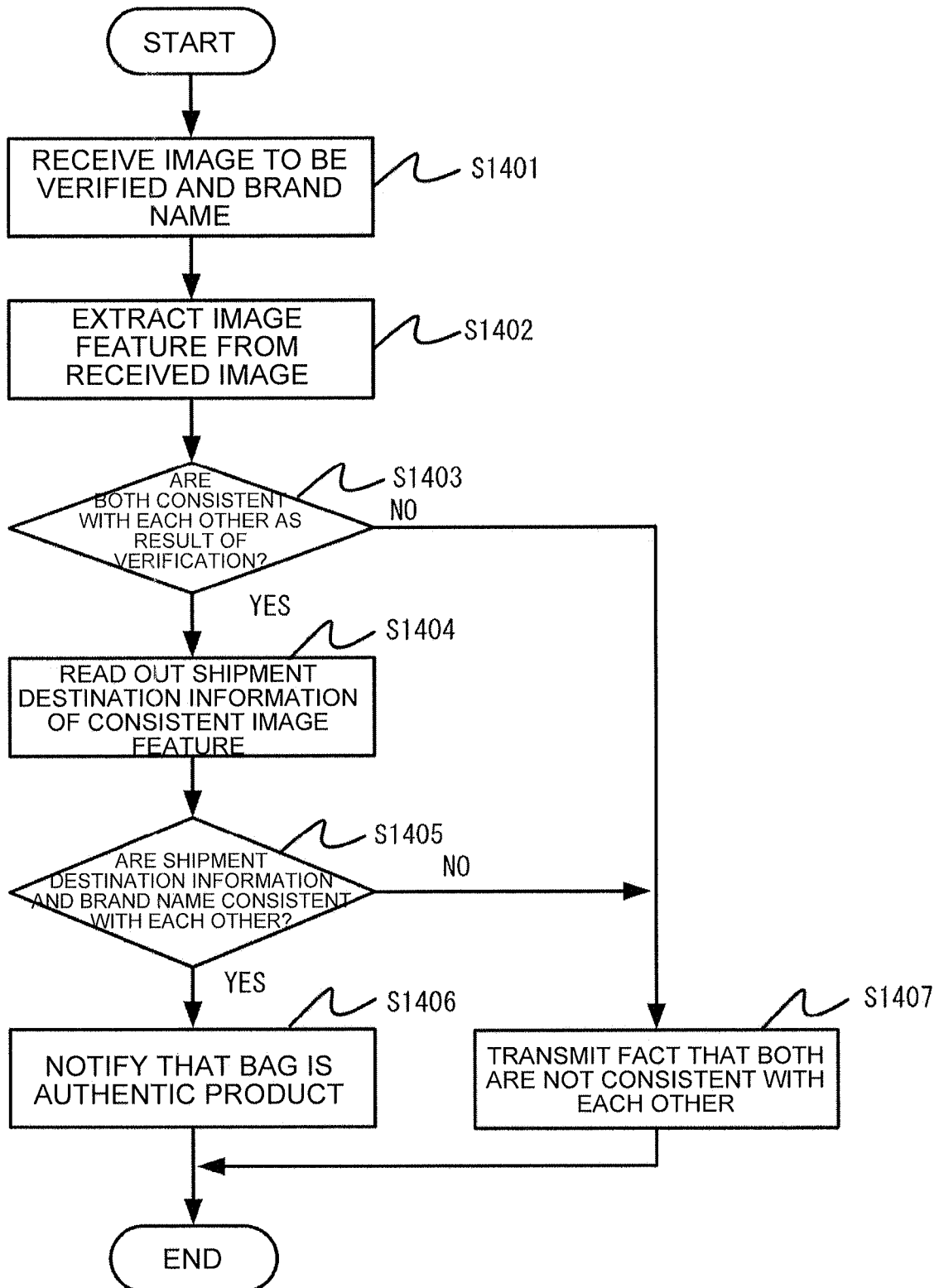

VERIFICATION METHOD, VERIFICATION SYSTEM, VERIFICATION APPARATUS, AND PROGRAM THEREFOR

CROSS-REFERENCE TO RELATED APPLICATIONS

This application is a national stage application of International Application No. PCT/JP2013/067123 entitled "VERIFICATION METHOD, VERIFICATION SYSTEM, VERIFICATION APPARATUS, AND PROGRAM THEREFOR" filed on Jun. 21, 2013, which claims priority to Japanese Application No. 2012-140355 filed on Jun. 22, 2012, the disclosures of which are hereby incorporated by reference in their entirety.

TECHNICAL FIELD

The present invention relates to a verification method, a verification system, a verification apparatus, and a program therefor.

BACKGROUND ART

For a quality control and a distribution control, recently, needs for verification and identification to products increases in molds, in units of lots, or in units of individual. To cope with the above, an RFID for performing data communication through a radio communication system is built into product. Further, a comprehensive merchandise management from production to a physical distribution, sales, and the like of the product, loss prevention, theft prevention, forgery prevention, or the like of merchandise is performed. In a technology of Patent Literature 1 and Patent Literature 2, for example, an RFID chip is arranged at a fastener that is fixed on an article. Through the above configuration, the verification for a physical distribution management, an authenticity assessment of merchandise, or the like can be performed by using data stored in a memory of the RFID chip.

CITATION LIST

Patent Literature

Patent Literature 1: Japanese Laid-open Patent Publication No. 2009-187580
Patent Literature 2: Japanese Laid-open Patent Publication No. 2002-125721

SUMMARY OF INVENTION

Technical Problem

However, there is a problem that in a technology of patent literatures, for example, high costs are required to build an RFID chip into an article like a fastener one by one. Further, depending on products such as semiconductors, even an ordinary tag cannot be also fixed, to say nothing of special device such as an RFID chip, in many cases.

The present invention is made to solve the above problem. Therefore, the purpose of the present invention is to provide a verification method, a verification system, a verification apparatus, and a program therefor that do not require a special device such as an IC tag, and are capable of verify products.

Solution to Problem

The present invention is directed to a verification method including acquiring an image feature of a component in a product to be verified and verifying the product to be verified on the basis of the acquired image feature of the component.

The present invention is directed to a verification system including an acquiring means for acquiring an image feature of a component in a product to be verified and a verifying means for verifying the product to be verified on the basis of the acquired image feature of the component.

The present invention is directed to a verification apparatus including a verifying means for verifying, on the basis of an acquired image feature of a component in a product to be verified, the product to be verified.

The present invention is directed to a program for a verification apparatus, and the program causes the verification apparatus to function as a verifying means for verifying, on the basis of an acquired image feature of a component in a product to be verified, the product to be verified.

Advantageous Effects of Invention

According to the present invention, even if a special device such as an IC tag is not introduced, merchandise can be verified.

BRIEF DESCRIPTION OF DRAWINGS

FIG. 15 is a flowchart for illustrating an example of operations according to the sixth embodiment of the present invention.

DESCRIPTION OF EMBODIMENTS

For the purpose of describing features of the present invention, descriptions will be specifically made below with reference to the accompanying drawings.

First Embodiment

A first embodiment of the present invention will be described in detail with reference to the accompanying drawings.

Figure 1:
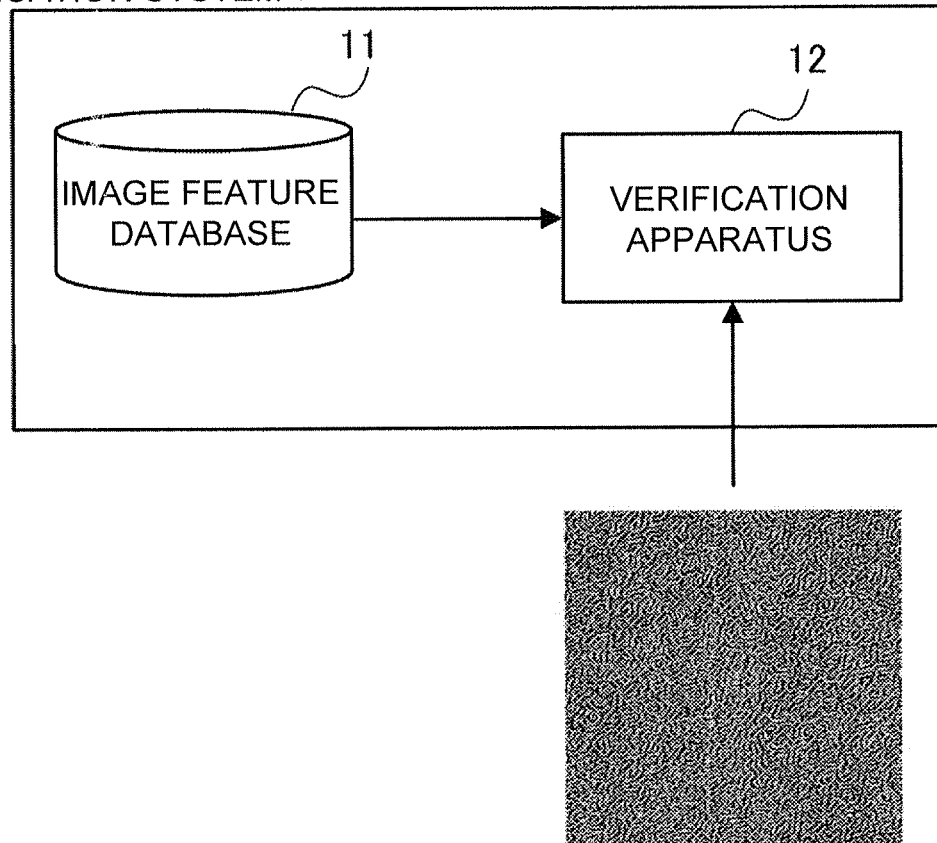
FIG. 1 is an example of a block diagram illustrating a verification apparatus of a verification system of the present invention.

FIG. 1 is a block diagram illustrating a verification system 1 of the present invention.

A verification system 1 according to the first embodiment of the present invention is a verification apparatus including a verification apparatus 12 that acquires an image feature of a component in a product and verifies a product on which the component is fixed on the basis of the acquired image feature of the component and image features of components stored in an image feature database 11.

The present invention is characterized in that features are used in which when a textured pattern that is provided to the component is delicately different in each individual, or as described below, when the components are the same kind of components, the textured pattern has a certain level of commonality, and the like, and a pattern (an irregular pattern) that is provided to a predetermined area on a surface of the component is verified, and thereby the product on which the component is fixed is also verified.

Here, when patterns in a predetermined area on a surface of a component can be specified, the component is not particularly limited. Like a TV set, a personal computer, a smartphone, a bag, and the like, the component is a component that general consumers buy as a completed product, or is a component used in the completed product, for example, a fastener, a clamp, a decorative component, and electronic components such as semiconductors. Materials may be metal, plastics, resins, leather, pottery, ceramics, or the like. Here, the fastener includes a slide fastener, a hook and loop fastener, a snap fastener, a rail fastener, a buckle, a cord stopper, a belt adjuster, a snap button, a button, and the like. Further, the clamp includes a swage, an eyelet, a screw, a nail, a bolt, a nut, and the like.

Further, examples of the textured pattern include not only a case where the textured pattern is formed as design, but also a case where the textured pattern is intentionally formed in a verification area for the purpose of identification or verification of an article.

Figure 2:
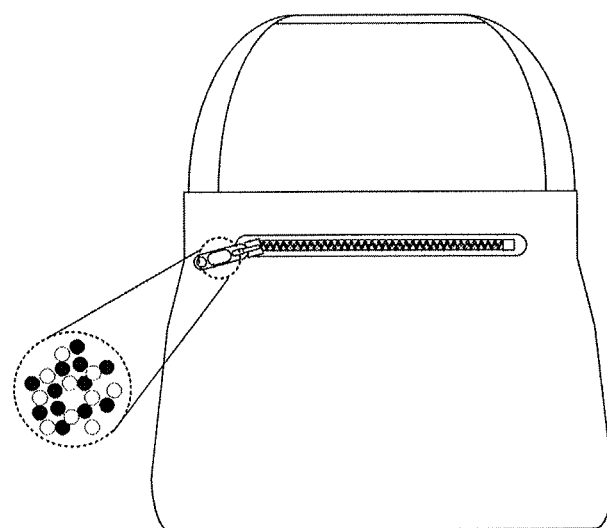
FIG. 2 is a view for illustrating a textured pattern of a leather product.

Further, in addition to the textured pattern provided by processing to the after-mentioned metal, synthetic resins (plastics and the like), or the like, in the pattern, a concept, for example, including patterns formed through a wrinkle pattern (grain) and a pattern and the like formed by blasting, etching, powder painting, or the like, obtained by processing (for example, emboss processing) a surface of a leather product is used. As illustrated in FIG. 2, for example, in the case of a bag of leather that has the emboss processing applied thereto, minute irregularity is formed at random on a surface of the leather of the bag, and the minute irregularity can be considered to be equal to the textured pattern.

As described above, texture processing or the emboss processing is applied to most of the fasteners or the leather products, and further the satin finish process is used also in package surfaces of electronic components in many cases. The patterns can be identified by using a processing method to, for example, metals, synthetic resins (plastics and the like), or the like in an individual group or in units of individuals. The processing method is considered to be roughly divided into two methods.

One is a processing method for applying the pattern to a component by processing the pattern to a mold and subjecting the component to press molding, injection molding, or casting. Through the processing method, an approximately identical pattern can be provided to all individuals fabricated from the same mold. On the other hand, when another mold is fabricated, a textured pattern of the another mold is different from the textured pattern of the mold, and therefore the component pattern obtained by subjecting the component to injection molding or casting by the mold is different from the component pattern fabricated from the another mold. In the case of the above-described processing, at least one or more is selected from an individual group (article group) that has the pattern provided thereto by a certain mold. Further, an image feature of the pattern in a verification area of the individual is registered as a representative value being a reference of the verification in the image feature database 11. Further, a component having an image feature that is consistent with the image features registered in the image feature database 11 can be verified as a component that has the pattern provided thereto by the mold.

This method has the advantage of being able to verify the individual group (article group) fabricated from a specific mold by using small registration data.

In another method, minute surface irregularity is generated through a plating process, painting, or processing of generating random minute irregular patterns in each individual of the component through etching, blasting, cutting, crystallization and powder painting, dispersion plating process, or the like. In the case of using the above-described processing, provided patterns are different in each individual of the component. Therefore, in each individual of the component, the image feature of the pattern provided to the verification area is registered in the image feature database 11. Further, a component having an image feature that is consistent with the image features registered in the image feature database 11 can be verified to be the component registered in the image feature database 11.

This method has the effect capable of verifying (identifying) the component in units of individuals since each individual of the components is different in the pattern.

Further, the above-described two methods are combined and the painting and the plating process are used in a portion that has the pattern provided thereto. Thereby, generation of a difference between individuals in the minute irregularity is advanced, and further an identification property can be improved. At this time, a difference between features in each mold still remains and a difference between features in each individual due to a process is further added, and thereby both can be verified, respectively. Particularly, a size of irregularity of the surface process that is applied to the mold is made rougher than that of the surface process in a subsequent stage, and thereby a difference between molds can be made larger than a difference between individuals, By use of the above method, a threshold to a degree of similarity of the feature amount at the time of the verification can be set loosely at the time of the verification in each mold as compared to the time of the verification in each individual, and verified by small registration data as described above. Further, by using this advantage, the verification throughput can be reduced through hierarchic verification.

Next, when the area is a predetermined area of the verification and is an area that has the pattern provided thereto, the entire pattern or a part of the pattern may be used as the verification area. Further, it is to be desired that ease of the verification processing be considered and a predetermined area to be verified be previously determined. As a predetermined area, an area of a position in which a reference portion that is present in common to components is determined as a reference is considered to be the verification area. Examples of the reference portion of the components include a trademark, a logo, a fabricator name, a fabrication company, a brand name, a component name, and a component number, and the like of the component attached, printed, die stamped, or heated and printed to or in the component. When the components are the same, these reference portions have the same pattern in common regardless of the individuals, and are distinctively viewed from an external appearance. Further, when a position and an attitude of the reference portions are determined as a reference and the feature is stored, the verification area of the component can be automatically detected. Further, as the predetermined area, it is to be desired that a pattern to be used for the verification be hard to receive deterioration, abrasion, or the like, and therefore it is effective that the area that is a concave portion of the component be used.

Further, a member (adapter) that is engaged with the side of the component that has the pattern provided thereto may be prepared, a hollow wall (hole) capable of viewing (imaging) the pattern from the outside may be provided in a part of the member, and an area capable of viewing (imaging) the pattern may be set as a predetermined area. As described above, in each case where the position and the attitude in a predetermined area of the verification are identified, it is unnecessary to recognize the position and the attitude of the area and the verification area can be definitely specified.

In addition, the image feature of the pattern for the verification may be different even in the same component individual depending on lighting conditions at the time of imaging the pattern that is provided to the component. The reason is that the pattern is formed from minute irregularity depending on shapes of the pattern, positions of shadows caused by the irregularity are different depending on the irradiation direction of light, and as a result the image feature is another feature. Accordingly, the pattern to be registered in the image feature database 11 and the pattern of the component to be verified are preferably imaged under the same lighting conditions. With the use of the adapter, when the component, the lighting, the position, and the attitude of an image pickup device are mutually fixed, the above problem can be solved.

Figure 3:
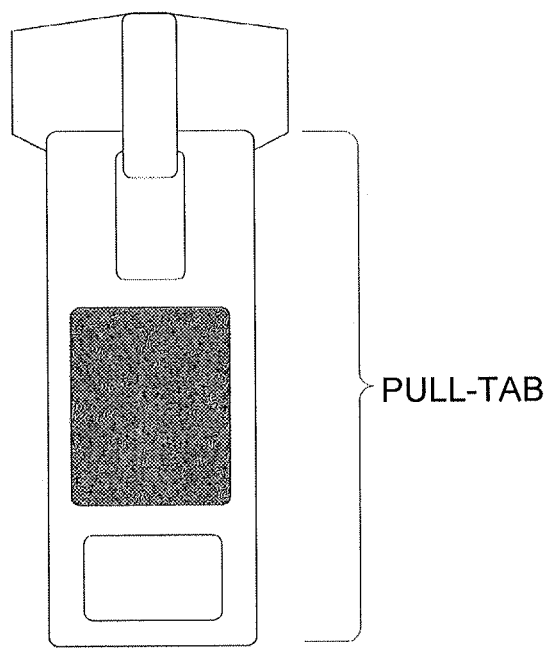
FIG. 3 is a view for illustrating an example of a verification area.

As illustrated in FIG. 3, in the following descriptions, the descriptions will be made by using a slide fastener as the component and a textured pattern as the pattern. An example where the entire textured pattern in a concave portion of a pull-tab of the slide fastener is set as the verification area will be used and described; however, it is not necessarily limited thereto.

Figure 4:
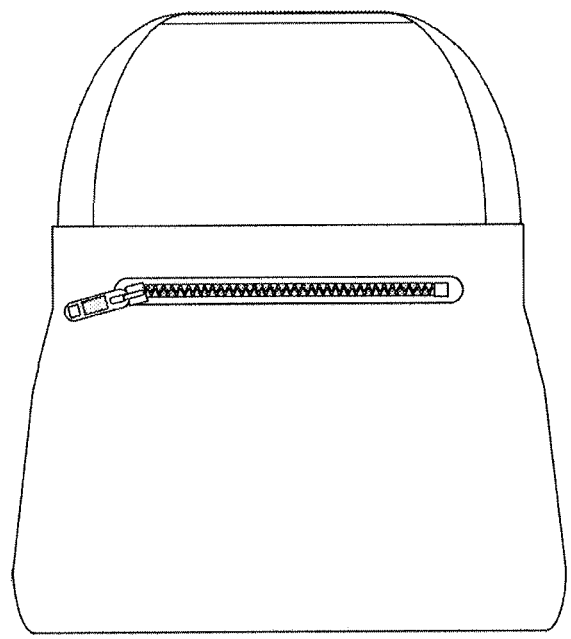
FIG. 4 is a view for illustrating a product to be verified.

When the product is a product on which the above-described component is fixed, it is not particularly limited thereto. As illustrated in FIG. 4, in the following descriptions, a bag on which the slide fastener is fixed will be described as an example.

Next, a configuration of each unit will be described.

As illustrated in FIG. 1, the verification system according to the present application includes the image feature database 11 and the verification apparatus 12.

The image feature database 11 is a database in which the image features of the textured pattern in the verification area of the pull-tab of the fabricated slide fastener are stored in association with product information. Here, the product information is information including at least one or more of producer identification information, product identification information, individual identification information, distribution course information, and verification information. The producer identification information is identification information for uniquely identifying a producer that produces bags being a product, for example, a manufacturer name, a brand name, and the like. In addition, the producer identification information is, for example, a concept including also a shipment destination and a shipment date and time of the slide fastener as the producer identification information. The product identification information is information for uniquely identifying a product on which the component is fixed, and is, for example, information indicating a merchandise name, a model number, a production date and time, a selling date and time, or a selling period. The individual identification number is identification information for individually identifying the product on which the component is fixed, and includes a production lot number and a serial number as an example therefor. The distribution course information is information in which a distribution course of the slide fastener or the bag on which the slide fastener is fixed is accumulated as a log, and is, for example, information about the distribution of a seller on the way of distribution, a selling date and time, a passing date and time and a passing place of a custom office, a final seller, a final selling date and time, a purchaser, and the like. The verification information is information about the verification of the product through the component having the image feature. Further, the verification information is information about imitation inspection results of the product on which the component having the image feature is fixed, a place, and a date and time at which the image feature is acquired, a worker that acquires the image feature, identifiable information from an appearance of the product on which the component having the image feature is fixed, and the like.

The verification apparatus 12 extracts the image feature from an image obtained by imaging the textured pattern of the pull-tab of the slide fastener that is fixed on the bag to be verified. Further, the verification apparatus 12 verifies the extracted image feature and the image features of the textured pattern stored in the image feature database 11. Further, the verification apparatus 12 verifies whether both are consistent with each other. In the case where both are consistent with each other, on the basis of the product information in association with the image feature, the verification apparatus 12 verifies consistency between product information in association with the image feature and obvious information (the brand, the serial number, and the like) from the design and the like or described separately in the product to be verified. In the case where both are consistent with each other, the verification apparatus 12 can authenticate the above bag as an authentic product. Here, with regard to the verification method of the image features, for example, in the case where a center of dots in the textured pattern is set to a feature point, an arrangement of the feature point is verified, and the number of combinations of the feature points in the same position (a range in a certain threshold) is more than or equal to a predetermined number, both is the same is determined. Further, in the case of a leather pattern or a wood grain pattern, end-points, an intersection point of lines, and a corner are set to the feature points, the arrangement of the feature points is verified, and the number of combinations of the feature points in the same position (a range in a certain threshold) is more than or equal to a predetermined number, both is the same is determined. An existing technology of fingerprint verification can be used as the above-described verification technology. In the descriptions, an example in which the image features of the stored textured pattern and the image features of the textured pattern to be verified are verified is described; however, it is not limited thereto in the present invention. In place of the image features, for example, an image of the stored textured pattern and an image of the textured pattern to be verified may be verified.

Further, the fastener that has the textured pattern provided thereto is described as an example; however, the article or the textured pattern is not limited thereto. For example, the present embodiment can be apparently applied not only to a case where the textured pattern is provided as the design, but also to a case where the textured pattern is intentionally provided to a predetermined verification area of the article for identification and verification.

Further, the textured pattern can be apparently provided not only to the textured pattern provided by processing to metals or synthetic resins (plastics and the like), like the fastener, but also to wrinkle patterns (emboss) or the like on a surface of the leather product as described above.

Second Embodiment

Continuously, a second embodiment of the verification system of the present application will be described. In the second embodiment, verification in the case where a component is managed so that a product is set to a bag, the component is set to a slide fastener, a pattern is set to a textured pattern, product information is set to a shipment destination, and a component fabricated from the same mold is shipped in each shipment destination will be described.

Figure 5:
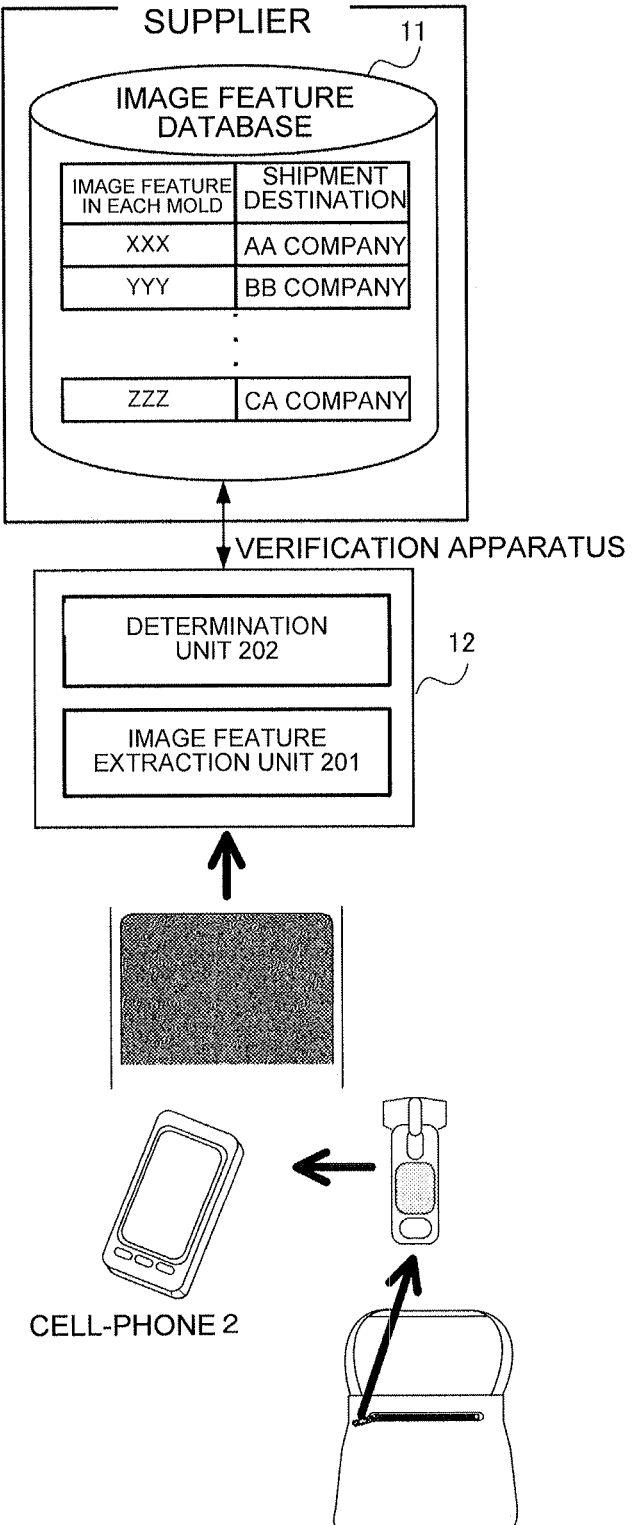
FIG. 5 is an example of a block diagram according to a second embodiment of the present invention.

FIG. 5 is a block diagram illustrating a verification system of the second embodiment. The verification system 1 includes the image feature database 11, the verification apparatus 12, and a cell-phone 2 of a consumer.

As illustrated in FIG. 5, in the image feature database 11, the image feature extracted from an image obtained by imaging in each mold the slide fastener that has the textured pattern provided thereto by the mold is stored in association with the shipment destination. When a component supplier fabricates or ships components, the image feature database 1 is created while the image feature of the component is associated with the producer identification information of the shipment destination, and the image feature database 11 is installed as a device of the component supplier side. In addition, in imaging the textured pattern of the pull-tab of the slide fastener, the component, lighting, and a position and an attitude of an image pickup device are supposed to be mutually fixed and then imaged with the use of the adapter.

The verification apparatus 12 includes an image feature extraction unit 201 and a determination unit 202. The image feature extraction unit 201 extracts the image feature from the image that is transmitted from the cell-phone 2 of the consumer and that is obtained by imaging the textured pattern of the pull-tab of the slide fastener that is fixed on the bag to be verified. The determination unit 202 verifies the image feature extracted by the image feature extraction unit 201 and the image features of the textured pattern stored in the image feature database 11, and searches for whether both are consistent with each other. In the case where both are consistent with each other, the verification apparatus 12 verifies consistency between product information (the producer identification information being the shipment destination) in association with the image feature and obvious information (the producer identification information such as a brand, or the product identification information such as a serial number) from the design and the like or described separately in the product to be verified. In the case where both are consistent with each other, the verification apparatus 12 can authenticate the above bag as an authentic product. On the other hand, as a result of the verification, in the case where the consistency is not recognized, there is the possibility that the bag is an imitation product can be determined.

From an appearance design of the bag of FIG. 5, for example, in the case where the bag is a product of AB company (or, an imitation product thereof) can be easily determined, when the image feature of the component is YYY, the consistency can be verified and the bag can be authenticated as an authentic product. Suppose, on the other hand, that the component is not a component of a component dealer that uses a regular component, or suppose that even if the component is a normal component, a third party that is not a producer of the bag obtains the components separately and produces the imitation products. In this case, the image feature of the component is different from YYY and, since the bag is not verified, the bag is an imitation product or may be an imitation product can be determined.

With the use of the adapter, by the cell-phone 2, the textured pattern of the pull-tab of the slide fastener of the bag to be verified is imaged by mutually fixing the component, the lighting, and the position and the attitude of the image pickup device on a predetermined relative relationship, and the imaged image is transmitted to the verification apparatus 12. In the present embodiment, the cell-phone will be used as an example, and the descriptions will be made. Further, when an image obtained by imaging the textured pattern of the pull-tab of the slide fastener of the bag to be verified can be transmitted, devices except the cell-phone may be used.

Figure 6:
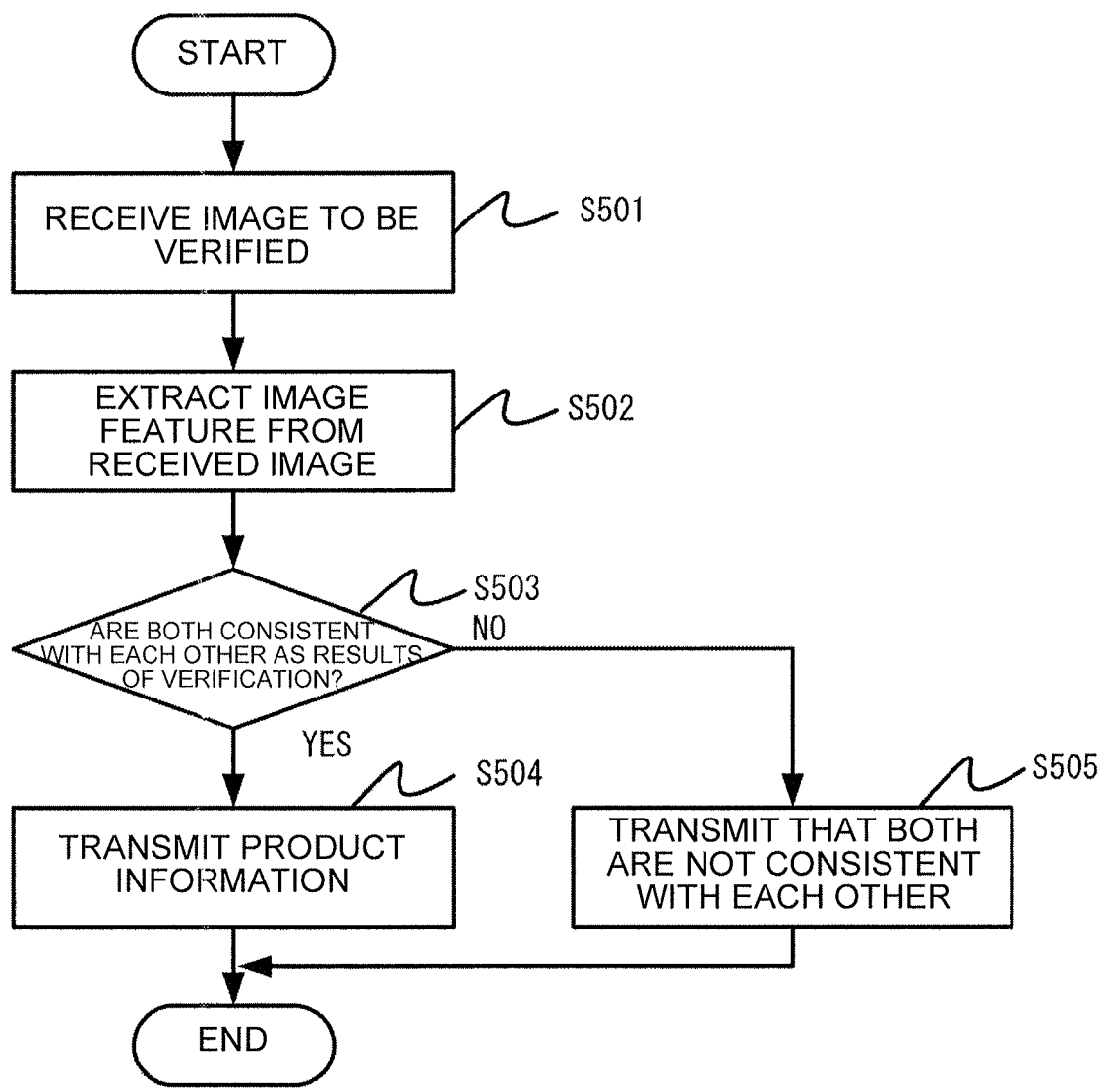
FIG. 6 is a flowchart for illustrating an example of operations according to the second embodiment of the present invention.

Next, operations of the verification system of the present application will be described with reference to FIG. 6.

For verifying the bag to be verified, the consumer transmits an image obtained by imaging the textured pattern in the predetermined area of the pull-tab by the cell-phone 2, and the verification apparatus 12 receives the image (S501).

The image feature extraction unit 201 of the verification apparatus 12 extracts the image feature of the textured pattern in the predetermined area from the received image by the same method as the above-described method and outputs the extracted image feature to the determination unit 202 (S502).

The determination unit 202 verifies the extracted image feature and the image features registered in the image feature database 11 (S503). In the case where both are consistent with each other (YES of S503), the determination unit 202 reads out the product information (shipment destination and the like) in association with the image feature and transmits the product information to the cell-phone 2 (S504). The consumer verifies the consistency between the received information about the shipment destination and the obvious product information (the brand, the serial number, and the like) from a logo and the like described in the product or design of the bag, and authenticates the bag as an authentic product in the case where both are correctly consistent with each other. As a result, an imitation product, a false description, and further the imitation product using another fastener fabricated by a regular components dealer can be also refused.

On the other hand, as a result of the verification, in the case where both are not consistent with each other (NO of S503), the fact that both are not consistent with each other is transmitted to the cell-phone 2 (S505). As a result, the consumer recognizes that the bag is camouflaged or may be camouflaged.

As described above, in the present embodiment, even if a producer of the product does not build an RFID chip or the like into the product one by one, a fastener the image feature of which is previously registered by a component dealer is used, and thereby the verification for an authenticity assessment and the like of the product can be performed. Therefore, the verification for the authenticity assessment and the like of the product merchandise can be performed at low cost.

Further, even if the consumer does not have special equipment, the bag can be verified. Further, as a result of the verification, product information about the product can be also acquired.

In the above-described embodiment, a case where the image feature is registered in each mold is used and descriptions are made. Further, the second embodiment may have a configuration in which the image feature in each fastener extracted from an image obtained by separately imaging the slide fastener that has the textured pattern provided thereto by the blasting is stored in association with the product identification information for identifying each of the products individually.

Further, in place of the shipment destination, or in addition to the shipment destination, information about the shipment date and time, a producer of products on which the fastener is fixed, a production period of the products, and the like is stored. Further, the consistency between any of the above information or the combined information and the obvious information (the brand, the serial number, and the like) from a logo and the like described in the product or design of the bag may be verified. Further, in the case where both are correctly consistent with each other, the bag may be authenticated as an authentic product.

Further, a configuration in which the image feature database 11 is provided on the component supplier side is used and descriptions are made. Further, the second embodiment may have a configuration in which the component supplier provides the image feature database 11 to the producer and the image feature database 11 is provided on the producer side. Further, the second embodiment may have a configuration in which the image feature database 11 is provided on the network.

Third Embodiment

Continuously, a third embodiment of the verification system of the present application will be described. In the third embodiment, verification in the case where a product is set to a bag, a component is set to a slide fastener, a pattern is set to a textured pattern, and product information is set to product identification information will be described. In addition, the same configurations as those of the second embodiment are indicated by the same reference numerals, and the detailed description will be omitted.

Figure 7:
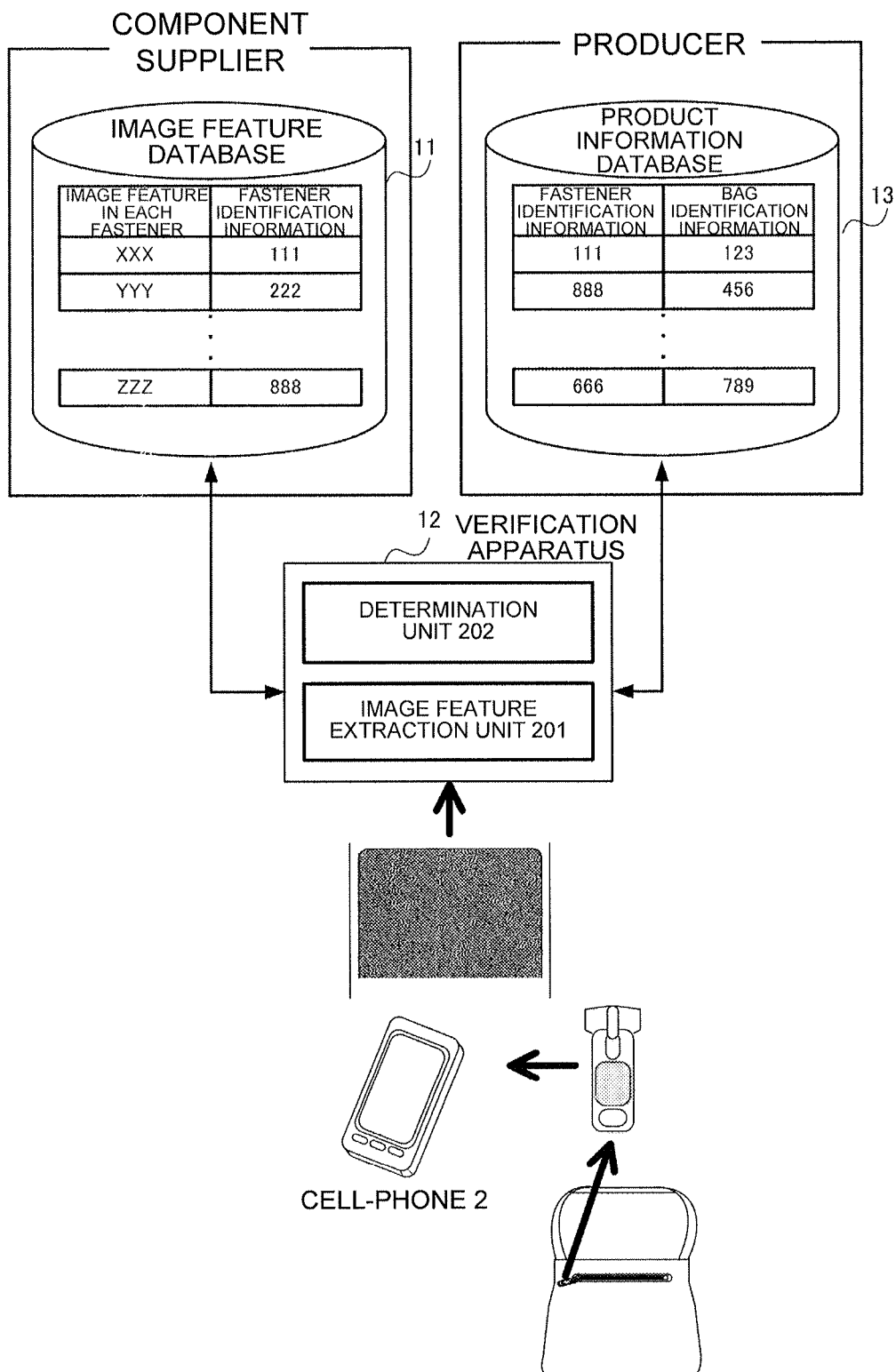
FIG. 7 is an example of a block diagram according to a third embodiment of the present invention.

FIG. 7 is a block diagram illustrating the verification system of the present embodiment.

In the present embodiment, the verification system 1 has the image feature database 11 and a product information database 13. In the image feature database 11, the image feature in each fastener extracted from an image obtained by separately imaging the slide fastener that has the textured pattern provided thereto by the blasting is stored in association with the fastener identification information for identifying each of the fasteners individually. At the time when a component supplier ships the fastener, the image feature database 11 is created while the image feature of the component is associated with the shipment destination, and the image feature database 11 is installed as a device on the component supplier side. In the product information database 13, the fastener identification information is stored in association with bag identification information (product identification information) for individually identifying each bag on which the fastener is fixed. The product information database 13 is created at the time of producing the products while the fastener identification information is associated with the bag identification information, and the product information database 13 is installed as a device on the producer side. In addition, in the present embodiment, a configuration in which the fastener identification information is associated with the product identification information will be described. Further, in addition to the product identification information, the fastener identification information may be stored also in association with a production date of the product, and the like.

The determination unit 202 of the verification apparatus 12 verifies the image feature extracted by the image feature extraction unit 201 and the image features of the textured pattern stored in the image feature database 11, and searches for whether both are consistent with each other. In the case where both are consistent with each other, the determination unit 202 reads out the fastener identification information in association with the image feature, and searches the product information database 13 for the bag identification information on the basis of the read-out fastener identification information. That is, in the present embodiment, the determination unit 202 searches for the bag identification information. A consumer verifies the consistency between the received bag identification information and the bag identification information about the bag, and authenticates the bag as an authentic product in the case where both are consistent with each other.

Figure 8:
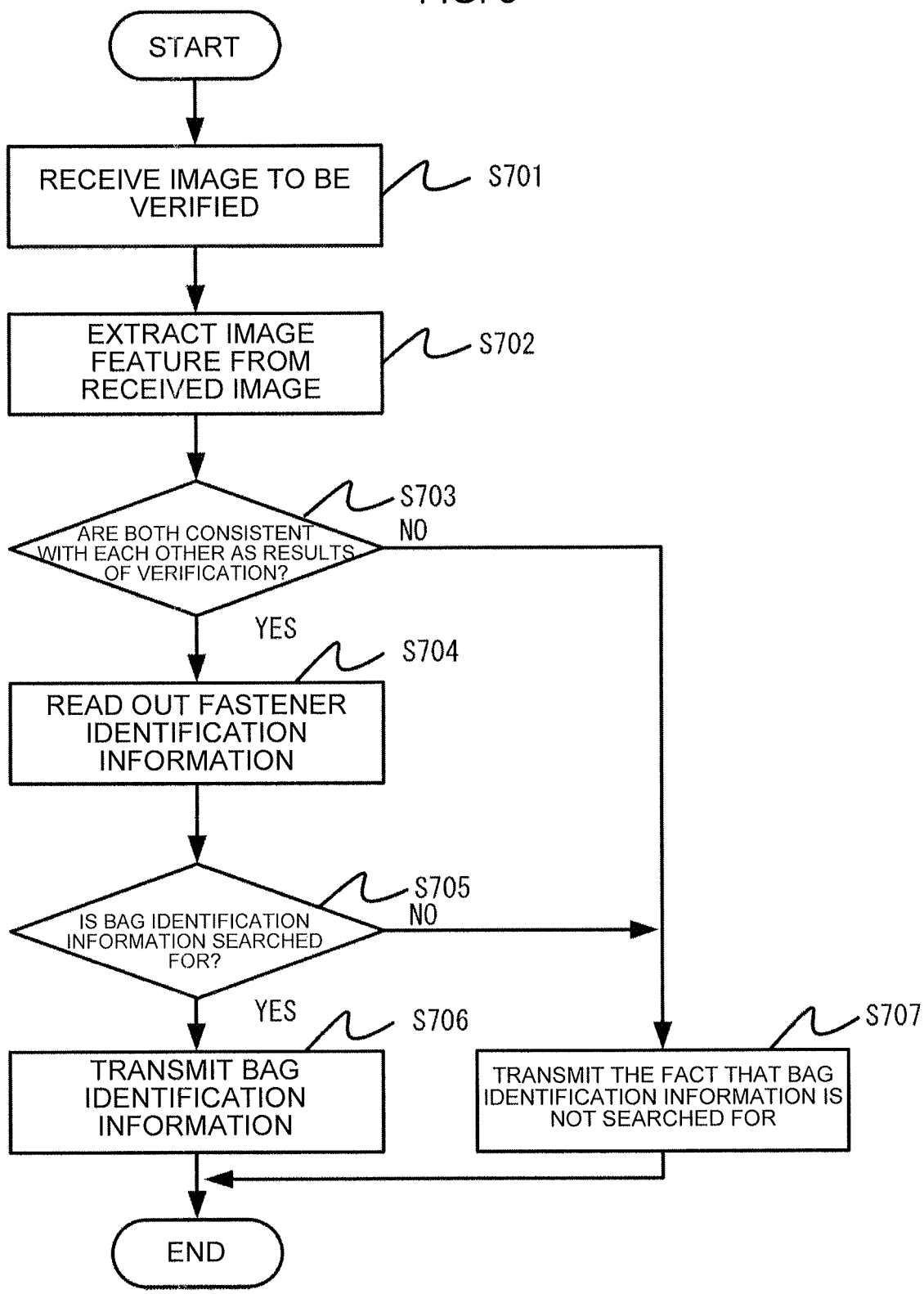
FIG. 8 is a flowchart for illustrating an example of operations according to the third embodiment of the present invention.

Next, operations of the verification system of this application will be described with reference to FIG. 8.

For verifying the bag to be verified, the consumer transmits an image obtained by imaging the textured pattern in the predetermined area of the pull-tab by the cell-phone 2, and the verification apparatus 12 receives the image (S701).

By the same method as the above-described method, the image feature extraction unit 201 of the verification apparatus 12 extracts the image feature of the textured pattern in the predetermined area from the received image, and outputs the extracted image feature to the determination unit 202 (S702).

The determination unit 202 verifies the extracted image feature and the image features registered in the image feature database 11 (S703).

In the case where both are consistent with each other (YES of S703), the determination unit 202 reads out the fastener identification information in association with the image feature (S704). The determination unit 202 searches the product information database 13 for the bag identification information on the basis of the read-out fastener identification information (S705). In the case where the bag identification information is searched for (YES of S705), the determination unit 202 transmits the searched-for bag identification information to the cell-phone 2 (S706). On the basis of whether the received bag identification information is consistent with the bag identification information about the bag to be verified, the consumer can authenticate whether the bag is a regular product.

On the other hand, as a result of the verification at S703, in the case where both are not consistent with each other (NO of S703), and as a result of the searching at S705, in the case where the bag identification information is not searched for (NO of S705), the determination unit 202 transmits to the cell-phone 2 the fact that information about the bag to be verified is not present (S707). As a result, the consumer recognizes that the bag is camouflaged or may be camouflaged.

As described above, in the present embodiment, even if an RFID chip is not built into fasteners one by one, the verification for the authenticity assessment and the like can be performed. Therefore, the verification for the authenticity assessment and the like for merchandise can be performed at low cost.

Further, even if the consumer does not have special equipment, the bag being the product can be verified. Further, as a result of the verification, information about the product can be also acquired.

Further, like the present embodiment, when the product information is configured as a database different from the image feature database, the producer can grasp component identification information about components that are built into the products by himself or herself. Therefore, the component identification information has only to be associated with the product identification information, and trouble for imaging components and acquiring the image feature of the component can be saved. Further, a secret of information about the product of his or her own can be kept to a component dealer, and on the other hand, the product of his or her own can be authenticated if necessary. Further, even if the component dealer does not manage the product information, the component identification information about his or her own component is only attached to components and provided to producers, and thereby value-added service of the component can be provided.

In the above-described embodiments, a case where the image feature is registered separately is used and descriptions are made. Further, like the second embodiment, the third embodiment may have a configuration in which the image feature in each mold is stored in association with the product identification information for identifying each of the products individually or information about a product group like a merchandise name and the like.

Further, in place of the bag identification information or along with the bag identification information, information about the selling date and time of the products, producers of the products, production period of the products, and the like may be stored. As a result, the consistency between the above information and the obvious information (the brand, the serial number, and the like) from a logo and the like described in the product or design of the bag is verified, and the bag may be authenticated as an authentic product in the case where both are correctly consistent with each other. Further, through the present configuration, a physical distribution management of the products can be also performed.

Further, a configuration in which the image feature database 11 is provided on the component supplier side and the product information database 13 is provided on the producer side is used and descriptions are made. Further, the third embodiment may have a configuration in which both are provided on the component supplier side, on the producer side, and on the third party on the network. Alternatively, the third embodiment may have a configuration in which one of the both is provided on the third party on the network.

Fourth Embodiment

Continuously, a fourth embodiment of the verification system of this application will be described. In the present embodiment, a case where distribution log information is stored as the product information will be described. In the fourth embodiment, verification in the case where a product is set to a bag, a component is set to a slide fastener, a pattern is set to a textured pattern, and product information is set to product identification information will be described. In addition, the same configurations as those of the above-described embodiments are indicated by the same reference numerals, and the detailed description will be omitted.

Figure 9:
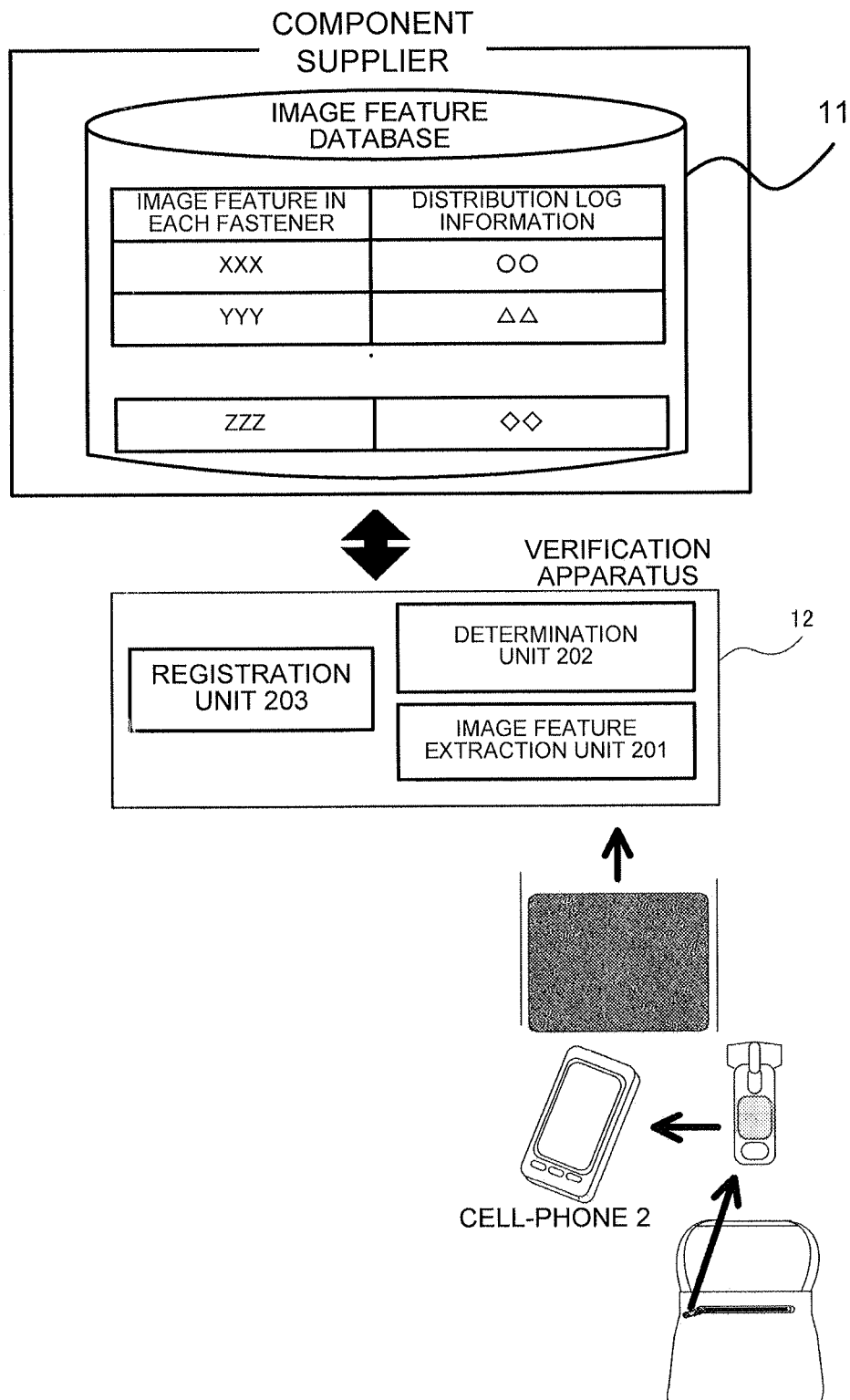
FIG. 9 is an example of a block diagram according to a fourth embodiment of the present invention.

FIG. 9 is a block diagram illustrating the verification system according to the fourth embodiment. In addition to the configuration of the above-described embodiments, the verification system 1 of the present embodiment includes a registration unit 203.

The registration unit 203 searches the image feature database 11 for an image feature that is consistent with the image feature extracted by the determination unit 202, and stores the image feature and the distribution log information about the fastener in association with each other. Here, the image feature and the distribution log information are stored in association with each other; further, the distribution log information may be stored in a form added to the product information except the distribution log information. Further, the distribution log information is not only one kind of information, but also information to be stored may be increased in an added form.

The image feature database 11 stores the image feature information in each fastener and the distribution log information in association with each other, and the image feature database 11 is installed on the component supplier side. The distribution log information is information in which the distribution course of the fastener or the bag on which the fastener is fixed is accumulated as a log. For example, the distribution log information is information about the distribution of a seller on the way of the distribution, a selling date and time, a passing date and time and a passing place of a custom office or an imitation product inspection, a final seller, a final selling date and time, a purchaser, and the like.

Figure 10:
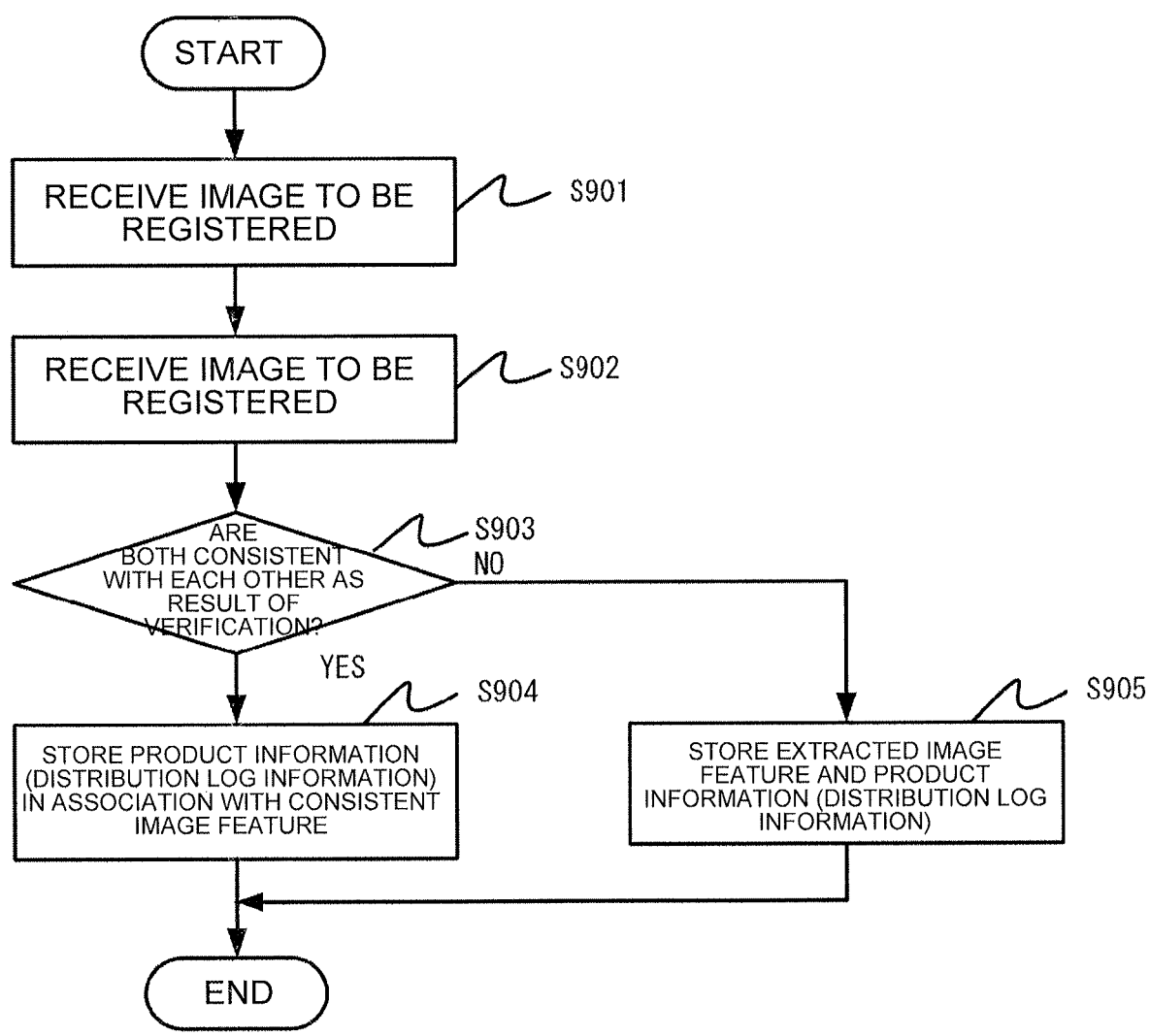
FIG. 10 is a flowchart for illustrating an example of registration operations according to the fourth embodiment of the present invention.

Next, operations of the present embodiment will be described. First, operations for registering the distribution log information in the distribution information database 15 will be described with reference to FIG. 10.

In a process of the distribution, by the cell-phone 2, a user transmits an image obtained by imaging the textured pattern in the predetermined area of the pull-tab, and the verification apparatus 12 receives the image (S901).

By using the same method as the above-described method, the image feature extraction unit 201 of the verification apparatus 12 extracts the image feature of the textured pattern in the predetermined area from the received image, and outputs the extracted image feature to the determination unit 202 (S902).

The registration unit 203 verifies the extracted image feature and the image features registered in the image feature database 11 (S903).

In the case where both are consistent with each other (YES of S903), the determination unit 202 stores the distribution log information in association with the image feature (S904). In the case where both are not consistent with each other (NO of S903), the determination unit 202 stores the image feature and the distribution log information in association with each other (S905).

Operations for distribution authentication through the verification apparatus 12 of the present embodiment are the same as those of the second embodiment, and therefore the descriptions will be omitted.

In addition, in the descriptions, a configuration in which the registration unit 203 is provided in the verification apparatus 12 is used and descriptions are made. Further, by use of a configuration that is different from that of the verification apparatus 12, a registration device 14 may be provided.

Further, in the descriptions, the distribution log information is stored in association with the image feature. In addition, the distribution log information may be further stored in association with the database in which the producer identification information, the product identification information, the individual identification information, and the like are already associated with the image feature. Further, the distribution log information is stored in the image feature database 11; further, a configuration in which a manager that manages the distribution log information is newly arranged, for example, on the network or the like may be used. In this case, the fourth embodiment has a configuration in which a database in which the image feature in each fastener and the fastener identification information are associated with each other is provided on the component supplier side, a database in which the fastener identification information or the image feature, and the product information, for example, the bag identification information are associated with each other is provided on the producer side, and further a database in which the fastener identification information or the image feature, and the distribution log information are associated with each other is provided on the manager side.

Figure 11:
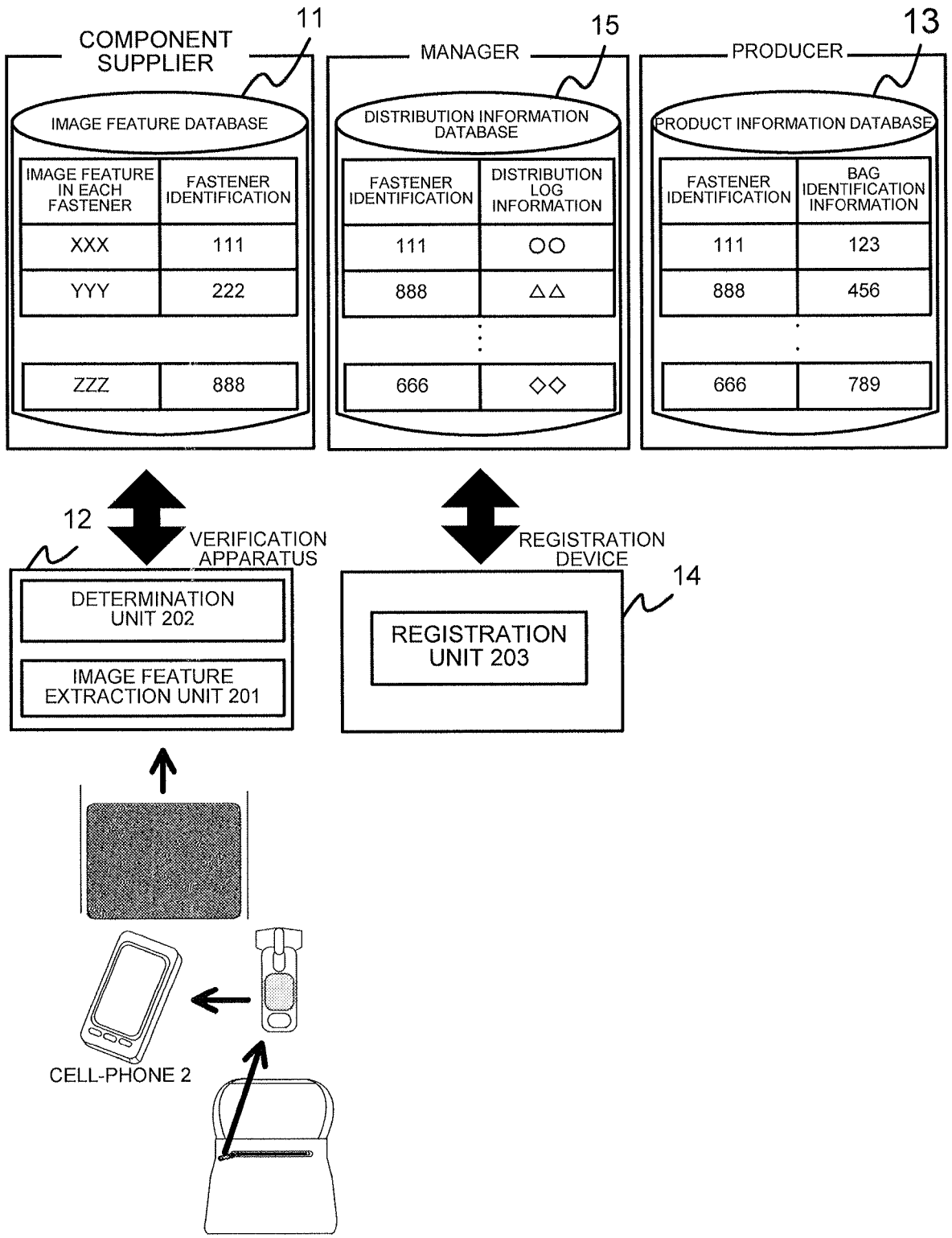
FIG. 11 is an example of a block diagram according to the fourth embodiment of the present invention.

Further, the registration unit 203 may be configured apart from the verification apparatus 12, and further a configuration in which a manager that manages the distribution log information is arranged may be used. A configuration in this case is illustrated in FIG. 11. Here, a configuration will be described in which a database in which the image feature in each fastener and the fastener identification information are associated with each other is provided on the component supplier side and a database in which the fastener identification information and the bag identification information are associated with each other is provided on the producer side.

The registration device 14 includes the registration unit 203. When the fastener identification information is received from the determination unit 201 of the verification apparatus 12, the registration unit 203 stores the fastener identification information and the fastener distribution information in the distribution information database 15 in association with each other.

The distribution information database 15 stores the fastener identification information and the distribution log information in association with each other, and is installed on the distribution manager side.

In addition to operations of the above-described embodiments, on the basis of the fastener identification information, the determination unit 202 of the verification apparatus 12 can search the distribution information database 15 for the distribution log information.

Figure 12:
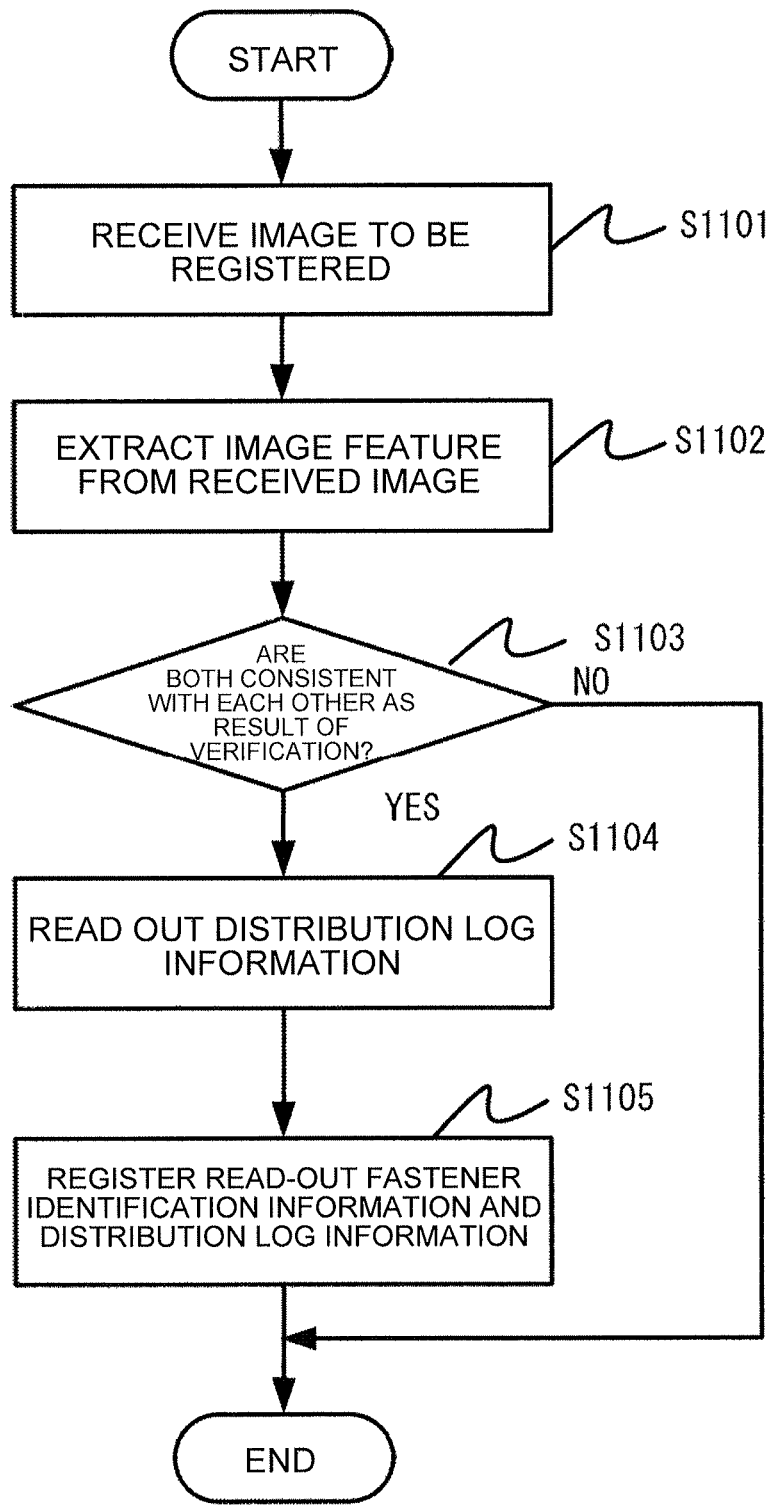
FIG. 12 is a flowchart for illustrating an example of registration operations according to the fourth embodiment of the present invention.

First, operations for registering the distribution log information in the distribution information database 15 will be described with reference to FIG. 12.

In a process of the distribution, by the cell-phone 2, the user transmits an image obtained by imaging the textured pattern in the predetermined area of the pull-tab, and the verification apparatus 12 receives the image (S1101).

By using the same method as the above-described method, the image feature extraction unit 201 of the verification apparatus 12 extracts the image feature of the textured pattern in the predetermined area from the received image, and outputs the extracted image feature to the determination unit 202 (S1102).

The determination unit 202 verifies the extracted image feature and the image features registered in the image feature database 11 (S1103).

In the case where both are consistent with each other (YES of S1103), the determination unit 202 reads out the fastener identification information in association with the image feature, and notifies the registration unit 203 of the read-out fastener identification information (S1104). In the case where both are not consistent with each other (NO of S1103), the process is ended.

The registration unit 203 associates the notified fastener identification information and the distribution log information input by the user with each other, and registers the distribution log information in the distribution information database 15 (S1105).

Figure 13:
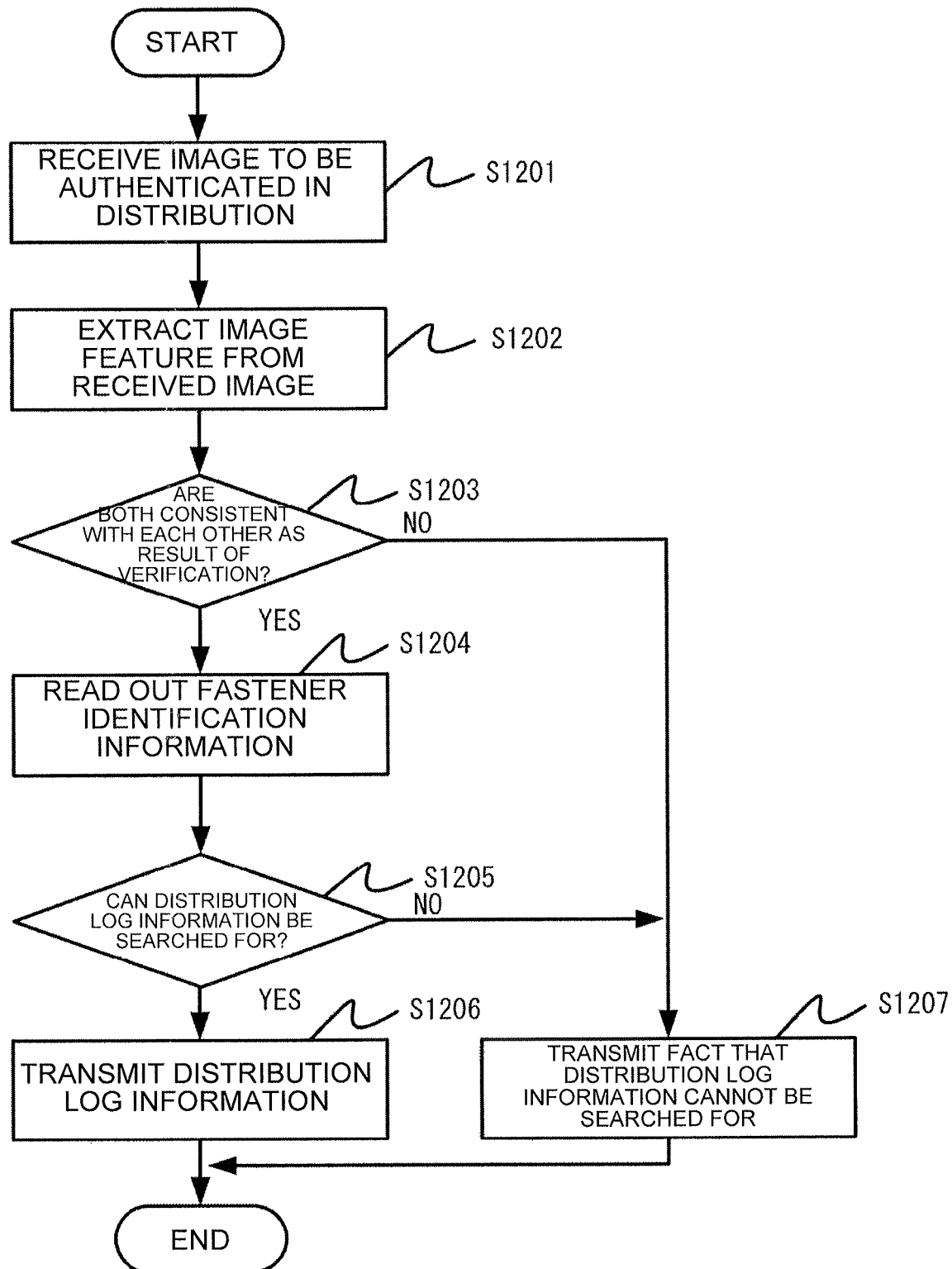
FIG. 13 is a flowchart for illustrating an example of operations for distribution authentication according to the fourth embodiment of the present invention.
Figure 14:
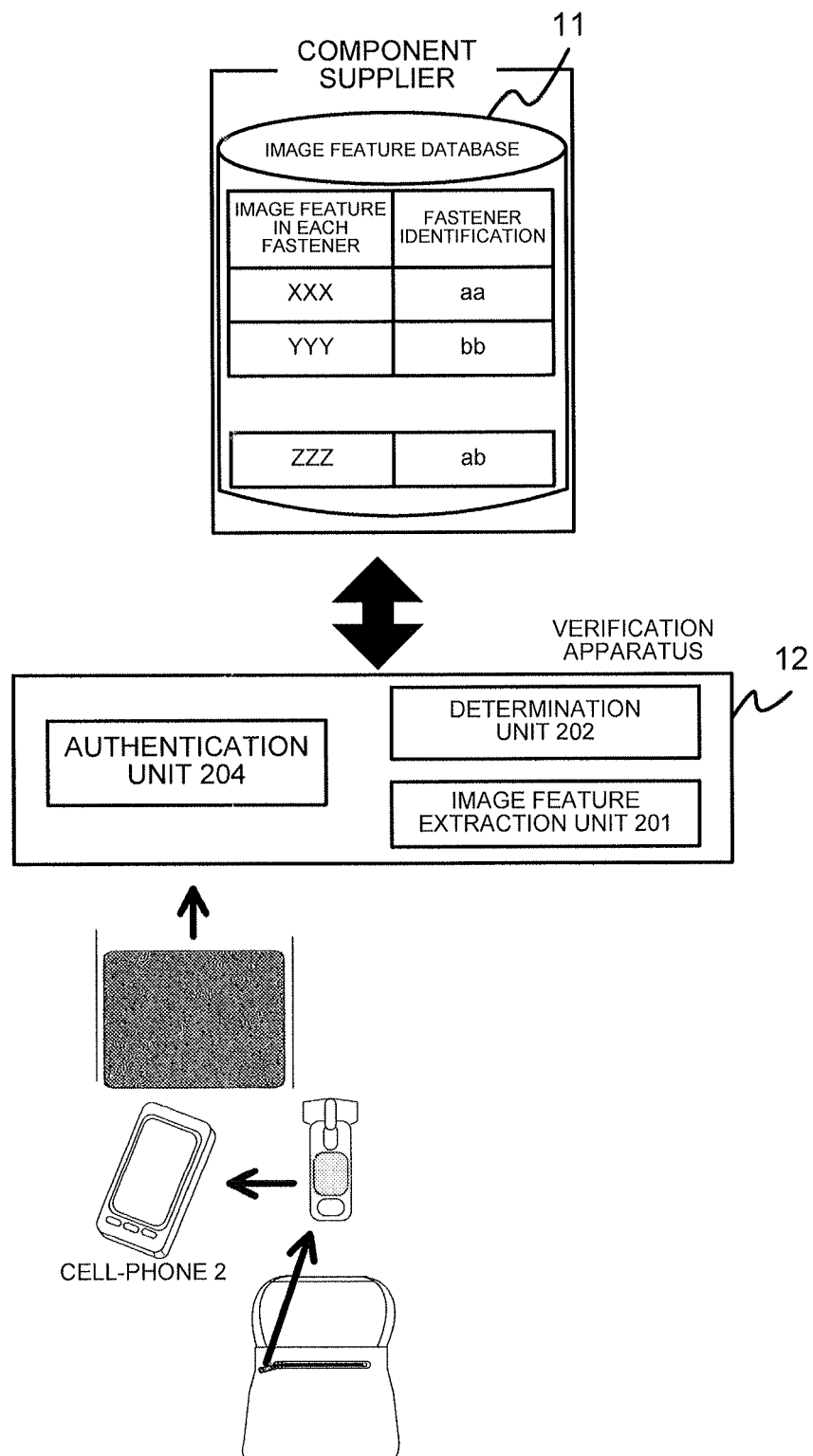
FIG. 14 is an example of a block diagram according to a sixth embodiment of the present invention.

Next, operations for the distribution authentication through the verification apparatus 12 will be described with reference to FIG. 13.

A consumer transmits the image obtained by imaging the textured pattern in the predetermined area of the pull-tab of the bag to be authenticated in the distribution, and the verification apparatus 12 receives the above image (S1201).

By using the same method as the above-described method, the image feature extraction unit 201 of the verification apparatus 12 extracts the image feature of the textured pattern in the predetermined area from the received image, and outputs the extracted image feature to the determination unit 202 (S1202).

The determination unit 202 verifies the extracted image feature and the image features registered in the image feature database 11 (S1203).

In the case where both are consistent with each other (YES of S1203), the determination unit 202 reads out the fastener identification information in association with the image feature (S1204). On the basis of the read-out fastener identification information, the determination unit 202 searches the distribution information database 15 for the distribution log information (S1205). In the case where the distribution information database 15 is searched for the distribution log information (YES of S1205), the searched-for distribution log information is transmitted to the cell-phone 2 (S1206). The consumer may verify the consistency between the received distribution log information and information about the distribution assumed from the obvious information (the brand, the serial number, and the like) from a logo and the like described in the product or design of the bag, and authenticate the bag as an authentic product in the case where both is consistent with each other. In addition, through the above configuration, a physical distribution management of the products can be also performed.

On the other hand, as a result of the verification at S1203, in the case where both are not consistent with each other (NO of S1203), and as a result of the searching at S1205, in the case where the distribution information database 15 is not searched for the distribution log information (NO of S1205), the determination unit 202 transmits to the cell-phone 2 the fact that information about the bag to be verified is not present (S1207). As a result, the consumer recognizes that the bag is camouflaged or may be camouflaged.

In addition, the distribution information database 15 on the manager side is provided in a distribution undertaker; further, may be stored in a form added to the image feature database of the component dealer and the product information database of the producer. In that case, the distribution information database 15 is managed through a string by information capable of searching for in common the component identification information, the image features of components, and the like. Further, in the configuration as illustrated in FIG. 7, the distribution log may be stored in association with each of the image feature database and the product information database.

As described above, according to the present embodiment, even if an RFID chip is not built into merchandise one by one, the physical distribution management, the authenticity assessment of the merchandise, and the like can be verified. Therefore, the verification for the physical distribution management of the merchandise can be performed at low cost. Further, when the distribution log in the case of failure in the verification (both are not consistent with each other) is analyzed, a finding place and a period of the imitation product can be also grasped.

Fifth Embodiment

Continuously, a fifth embodiment of the verification system of this application will be described. In the present embodiment, a configuration in which the verification information is stored as the product information will be described. In addition, the same configurations as those of the above-described embodiments are indicated by the same reference numerals, and the detailed descriptions will be omitted. Further, the fifth embodiment is applied to a case of the same configuration as that of FIG. 9 of the fourth embodiment, and the descriptions will be made. Further, the fifth embodiment may be applied to any configuration of the embodiments as described above.

In the image feature database 11, the registration unit 203 of the present embodiment stores, as the product information, the verification information about verification results through the verification apparatus 12 of the above-described embodiments. Further, in the case where the verification place is stored as the verification information, positional information of the cell-phone 2 by which the image information of the fastener to be verified is imaged is supposed to be acquired by a GPS function of the cell-phone, or by the positional information input with the use of the cell-phone 2 through a consumer.

In addition, operations from the results up to the registration of the verification are the same operations as those of S903 to S905, and therefore the detailed descriptions will be omitted.

As described above, according to the present embodiment, when the products or the components are verified, the verification results and information about a place and a date and time of an object to be verified, a person in charge that performs the verification, and the like are accumulated as log data. Therefore, the component dealer or the product dealer can acquire market information about sales conditions, distribution course of his or her own products, how the products have been used, where an imitation product is generated, or the like. Further, the producer can acquire information obtained by performing market research or through distribution undertakers.

Sixth Embodiment

In the above-described embodiments, a consumer verifies the consistency between the verification results and the obvious information (the brand, the serial number, and the like) from a logo and the like described in the product or design of the bag, and authenticates the bag as an authentic product in the case where both are correctly consistent with each other. In the present embodiment, a configuration in which the verification apparatus performs the above will be described. In addition, the same configurations as those of the second embodiment are indicated by the same reference numerals, and the detailed descriptions will be omitted. In the following descriptions, a case where the image feature of the fastener and the brand name as the shipment destination information are stored in the image feature database 11 on the component supplier side in association with each other will be used, and the present embodiment will be described. Any one of the configurations described in the first to fifth embodiments may be used.

In the verification apparatus 12 of the present embodiment, an authentication unit 204 that performs an authenticity assessment of the product to be verified is newly provided. The authentication unit 204 verifies the brand name of the bag transmitted from the cell-phone 2 and the shipment destination read-out by the determination unit 202. In the case where both are consistent with each other, the bag is authenticated as an authentic product. On the other hand, in the case where both are not consistent with each other, the bag is camouflaged or may be camouflaged is determined.

The cell-phone 2 transmits the brand name of the bag to be verified input by the consumer along with the imaged image.

Operations of the present embodiment will be described with reference to FIG. 15.

For verifying the bag to be verified, by the cell-phone 2, the consumer transmits the brand name of the bag and the image obtained by imaging the textured pattern in the predetermined area of the pull-tab, and the verification apparatus 12 receives the image (S1401).

By using the same method as the above-described method, the image feature extraction unit 201 of the verification apparatus 12 extracts the image feature of the textured pattern in the predetermined area from the received image, and outputs the extracted image feature to the determination unit 202 (S1402).

The determination unit 202 verifies the extracted image feature and the image features registered in the image feature database 11 (S1403). In the case where both are consistent with each other (YES of S1403), the determination unit 202 reads out the shipment destination information in association with the image feature and notifies the authentication unit 204 of the read-out shipment destination information (S1404). The authentication unit 204 verifies the notified shipment destination information and the received brand name of the bag (S1405). As a result of the verification, in the case where both are consistent with each other (YES of S1405), the bag is authenticated as an authentic product and the above fact is transmitted to the cell-phone 2 (S1406). Thereby, an imitation product, a false description, and further the imitation product using another fastener fabricated by a regular components dealer can be also refused.

On the other hand, as a result of the verification, in the case where both are not consistent with each other in the verification of S1403 (NO of S1403), or in the case where both are not consistent with each other in the verification of S1405 (NO of S1405), the fact that both are not consistent with each other is transmitted to the cell-phone 2 (S1407). As a result, the consumer recognizes that the bag is camouflaged or may be camouflaged.

In the above-described embodiments, an authenticity assessment is performed by a kind of information. Further, plural kinds of information are input by the consumer, and the plural kinds of information may be combined to perform the authenticity assessment. In this case, a rate of the possibility that the bag is an authentic product or an imitation product can be also calculated and proposed to the consumer.

In the first to fifth embodiments described above, the verification apparatus 12 performs the verification processing. Further, from a database in which the image features of the components are registered like the image feature database 11, the image feature is previously downloaded, and the verification processing may be performed by the cell-phone 2 without the communication.

Further, in the first to fifth embodiments described above, a configuration in which the image imaged by the cell-phone 2 is transmitted to the verification apparatus 12 is used. Further, a configuration in which the image feature of the imaged image is extracted and the extracted image is transmitted by the cell-phone 2, and the transmitted image feature is verified by the verification apparatus 12 may be used.

Further, the verification apparatus of the first to fifth embodiments described above may be configured in the cell-phone 2.

In the above-described embodiments, when the distribution log information or the verification information is stored as the product information, statistical processing of information about the predetermined component or product may be performed and a statistical processing unit that outputs distribution, sales, and usage conditions of the products may be provided. Further, when the verification results or the authentication results of the authenticity assessment of the products, and the verification places are stored as the verification information, statistical processing of information about failure in the verification may be performed and an analyzing device that analyzes generation conditions of the imitation products may be provided.

As an example thereof, in the above-described embodiments, the brand name of the bag to be verified input by the consumer is stored in the distribution information database 15 in association with the image feature of the textured pattern acquired from the fastener of the bag.

At this time, when a component producer manages the distribution information database, the fastener in association with the image pattern used in the verification can be known to be used in which bag of which brand. Further, the fastener component dealer can know a usage purpose of the fastener and apply the usage purpose to performance or designing. Alternatively, when the producer of the products manages the distribution information database, the produced product can be known to be distributed to which area for usage, and marketing information about the products can be obtained.

Further, in the case where an imitation product of a certain brand is distributed in a certain area in plurality, when the brand is verified in the area, the fact that failure in the verification is generated in plurality is stored in the distribution information database 15. Accordingly, data that is failed in the verification is collected, and thereby distribution conditions of imitation products of the brand can be statistically known.

Further, in the first to fourth embodiments described above, an example where the verification is performed for the authenticity assessment is used and descriptions are made. Further, the verification can be, of course, used as a purpose not for performing the authenticity assessment but for specifying an individual identification number, a production lot number, and the like of the product.

Further, as is apparent from the descriptions, each of the above-described configuration units of the present invention can be configured by hardware, and further realized by a computer program.

In the case of the above-described configuration, the same functions and operations as those of the above-described embodiments are realized by using a processor operating by a program stored in a program memory. In addition, functions of a part of the above-described embodiments can be realized by a computer program.

As described above, the present invention is described with reference to preferred embodiments and examples. Further, the present invention is not necessarily limited to the above embodiments and examples, but can be variously verified and performed in a range of technical idea.

(Supplementary Note 1)

A verification method including:

acquiring image feature of a component in a product to be verified; and verifying the product to be verified on the basis of the acquired image feature of the component.

(Supplementary Note 2)

The verification method described in the supplementary note 1, wherein the image feature of the component is stored in a storage unit in association with product information about the product on which the component is fixed; and in the verification, the product information about the product to be verified and the product information stored in the storage unit are verified.

(Supplementary Note 3)

The verification method described in the supplementary note 1 or 2, further including registering, in the verification, one or both of the product information about the product to be verified and the verification information in the storage unit in association with the acquired image feature.

(Supplementary Note 4)

The verification method described in any one of the supplementary notes 1 to 3, wherein the storage unit has a storage unit on a supplier side of the component in which the image feature of the component supplied to a producer of the product from a supplier of the component is associated with identification information about the component, and a storage unit on a producer side of the product in which the identification information about the component is associated with the product information; and in the verification, the identification information about the component is acquired from the storage unit on the supplier side of the component on the basis of the acquired image feature, and the product information is acquired for verification from the storage unit on the producer side of the product on the basis of the acquired identification information about the component.

(Supplementary Note 5)

The verification method described in any one of the supplementary notes 2 to 4, wherein the product information includes at least one or more information of the identification information for identifying the producer, the identification information for identifying the product produced by the producer, the identification information for identifying an individual of the product, distribution course information indicating a distribution course of the component or the product, and the verification information about the verification of the product.

(Supplementary Note 6)

The verification method described in any one of the supplementary notes 2 to 5, wherein the verification information about the verification upon performing the verification by using the image feature is registered in the storage unit as the product information in association with the acquired image feature, statistical processing of the registered verification information is performed, and generation conditions of an imitation product are analyzed.

(Supplementary Note 7)

The verification method described in any one of the supplementary notes 2 to 6, wherein the distribution course of information about a component having the image feature or a product on which a component having the image feature is fixed is registered in the storage unit as the product information in association with the acquired image feature, statistical processing of the registered distribution course information is performed, and at least one of the distribution course, selling conditions, and usage conditions of the predetermined component or the product is analyzed.

(Supplementary Note 8)

The verification method described in the supplementary note 6 or 7, wherein the predetermined area is a concave portion of the component.

(Supplementary Note 9)

The verification method described in any one of the supplementary notes 1 to 8, wherein the image feature of the component is a pattern in a predetermined area generated in a process in which the component is fabricated.

(Supplementary Note 10)

The verification method described in the supplementary note 9, wherein the pattern is a textured pattern that is provided to the component.

(Supplementary Note 11)

The verification method described in any one of the supplementary notes 1 to 10, wherein the component is at least any one of a fastener, a screw, a nail, a nut, and an electronic component.

(Supplementary Note 12)

The verification method described in the supplementary note 11, wherein the fastener is at least any one of a slide fastener, a hook and loop fastener, a snap fastener, a rail fastener, a buckle, a cord stopper, a belt adjuster, a loop clutch, a snap button, and a button.

(Supplementary Note 13)

The verification method described in any one of the supplementary notes 1 to 12, wherein the component is any material of leather, metal, plastics, pottery, ceramics, and resins.

(Supplementary Note 14)

The verification method described in any one of the supplementary notes 1 to 13, where the textured pattern is intentionally provided to an article for identification or verification.

(Supplementary Note 15)

A verification system including:

an acquiring means for acquiring image feature of a component in a product to be verified; and a verifying means for verifying the product to be verified on the basis of the acquired image feature of the component.

(Supplementary Note 16)

The verification system described in the supplementary note 15, wherein the image feature of the component is stored in a storage unit in association with product information about the product on which the component is fixed; and the verifying means verifies the product information about the product to be verified and the product information stored in the storage unit.

(Supplementary Note 17)

The verification system described in the supplementary note 14 or 16, further including a registering means for registering, in the verification, one or both of the product information about the product to be verified and the verification information in the storage unit in association with the acquired image feature.

(Supplementary Note 18)

The verification system described in any one of the supplementary notes 15 to 17, wherein the storage unit has a storage unit on a supplier side of the component in which the image feature of the component supplied to a producer of the product from a supplier of the component is associated with identification information about the component, and a storage unit on a producer side of the product in which the identification information about the component is associated with the product information; and the verifying means acquires, for verification, the identification information about the component from the storage unit on the supplier side of the component on the basis of the acquired image feature, and acquires the product information from the storage unit on the producer side of the product on the basis of the acquired identification information about the component.

(Supplementary Note 19)

The verification system described in any one of the supplementary notes 16 to 18, wherein the product information includes at least one or more information of the identification information for identifying the producer, the identification information for identifying the product produced by the producer, the identification information for identifying an individual of the product, distribution course information indicating a distribution course of the component or the product, and the verification information about the verification of the product.

(Supplementary Note 20)

The verification system described in any one of the supplementary notes 16 to 19, wherein the registering means registers the verification information about the verification upon performing the verification by using the image feature in the storage unit as the product information in association with the acquired image feature, and has an analyzing means that performs statistical processing of the registered verification information, and analyzes generation conditions of an imitation product.

(Supplementary Note 21)

The verification system described in any one of the supplementary notes 16 to 20, wherein the registration unit registers the distribution course of information about a component having the image feature or a product on which a component having the image feature is fixed in the storage unit as the product information in association with the acquired image feature, and has an analyzing means that performs statistical processing of the registered distribution course information, and analyzes at least one of the distribution course, selling conditions, and usage conditions of the predetermined component or the product.

(Supplementary Note 22)

The verification system described in the supplementary note 20 or 21, wherein the predetermined area is a concave portion of the component.

(Supplementary Note 23)

The verification system described in any one of the supplementary notes 15 to 22, wherein the image feature of the component is a pattern in a predetermined area generated in a process in which the component is fabricated.

(Supplementary Note 24)

The verification system described in the supplementary note 23, wherein the pattern is a textured pattern that is provided to the component.

(Supplementary Note 25)

The verification system described in any one of the supplementary notes 15 to 24, wherein the component is at least any one of a fastener, a screw, a nail, a nut, and an electronic component.

(Supplementary Note 26)

The verification system described in the supplementary note 25, wherein the fastener is at least any one of a slide fastener, a hook and loop fastener, a snap fastener, a rail fastener, a buckle, a cord stopper, a belt adjuster, a loop clutch, a snap button, and a button.

(Supplementary Note 27)

The verification system described in any one of the supplementary notes 15 to 26, wherein the component is any material of leather, metal, plastics, pottery, ceramics, and resins.

(Supplementary Note 28)

The verification system described in any one of the supplementary notes 15 to 27, where the textured pattern is intentionally provided to an article for identification or verification.

(Supplementary Note 29)

A verification apparatus including:

a verifying means for verifying, on the basis of an acquired image feature of a component in a product to be verified, the product to be verified.

(Supplementary Note 30)

The verification apparatus described in the supplementary note 29, wherein the image feature of the component is stored in a storage unit in association with product information about the product on which the component is fixed; and the verifying means verifies the product information about the product to be verified and the product information stored in the storage unit.

(Supplementary Note 31)

The verification apparatus described in the supplementary note 27 or 30, further including a registering means for registering, in the verification, one or both of the product information about the product to be verified and the verification information in the storage unit in association with the acquired image feature.

(Supplementary Note 32)

The verification apparatus described in any one of the supplementary notes 29 to 31, wherein the storage unit has a storage unit on a supplier side of the component in which the image feature of the component supplied to a producer of the product from a supplier of the component is associated with identification information about the component, and a storage unit on a producer side of the product in which the identification information about the component is associated with the product information; and the verifying means acquires, for verification, the identification information about the component from the storage unit on the supplier side of the component on the basis of the acquired image feature, and acquires the product information from the storage unit on the producer side of the product on the basis of the acquired identification information about the component.

(Supplementary Note 33)

The verification apparatus described in any one of the supplementary notes 30 to 32, wherein the product information includes at least one or more information of the identification information for identifying the producer, the identification information for identifying the product produced by the producer, the identification information for identifying an individual of the product, distribution course information indicating a distribution course of the component or the product, and the verification information about the verification of the product.

(Supplementary Note 34)

The verification apparatus described in any one of the supplementary notes 30 to 33, wherein the registering means registers the verification information about the verification upon performing the verification by using the image feature in the storage unit as the product information in association with the acquired image feature, and has an analyzing means that performs statistical processing of the registered verification information, and analyzes generation conditions of an imitation product.

(Supplementary Note 35)

The verification apparatus described in any one of the supplementary notes 30 to 34, wherein the registration unit registers the distribution course of information about a component having the image feature or a product on which a component having the image feature is fixed in the storage unit as the product information in association with the acquired image feature, and has an analyzing means that performs statistical processing of the registered distribution course information, and analyzes at least one of the distribution course, selling conditions, and usage conditions of the predetermined component or the product.

(Supplementary Note 36)

The verification apparatus described in the supplementary note 33 or 35, wherein the predetermined area is a concave portion of the component.

(Supplementary Note 37)

The verification apparatus described in any one of the supplementary notes 29 to 36, wherein the image feature of the component is a pattern in the predetermined area generated in a process in which the component is fabricated.

(Supplementary Note 38)

The verification apparatus described in the supplementary note 37, wherein the pattern is a textured pattern that is provided to the component.

(Supplementary Note 39)

The verification apparatus described in any one of the supplementary notes 29 to 38, wherein the component is at least any one of a fastener, a screw, a nail, a nut, and an electronic component.

(Supplementary Note 40)

The verification apparatus described in the supplementary note 39, wherein the fastener is at least any one of a slide fastener, a hook and loop fastener, a snap fastener, a rail fastener, a buckle, a cord stopper, a belt adjuster, a loop clutch, a snap button, and a button.

(Supplementary Note 41)

The verification apparatus described in any one of the supplementary notes 29 to 40, wherein the component is any material of leather, metal, plastics, pottery, ceramics, and resins.

(Supplementary Note 42)

The verification apparatus described in any one of the supplementary notes 29 to 41, where the textured pattern is intentionally provided to an article for identification or verification.

(Supplementary Note 43)

A program for a verification apparatus and causing the verification apparatus to function as a verifying means for verifying, on the basis of an acquired image feature of a component in a product to be verified, the product to be verified.

(Supplementary Note 44)

The program described in the supplementary note 43, wherein the image feature of the component is stored in a storage unit in association with product information about the product on which the component is fixed; and the verifying means verifies the product information about the product to be verified and the product information stored in the storage unit.

(Supplementary Note 45)

The program described in the supplementary note 27 or 44, further including a registering means for registering, in the verification, one or both of the product information about the product to be verified and the verification information in the storage unit in association with the acquired image feature.

(Supplementary Note 46)

The program described in any one of the supplementary notes 43 to 45, wherein the storage unit has a storage unit on a supplier side of the component in which the image feature of the component supplied to a producer of the product from a supplier of the component is associated with identification information about the component, and a storage unit on a producer side of the product in which the identification information about the component is associated with the product information; and the verifying means acquires, for verification, the identification information about the component from the storage unit on the supplier side of the component on the basis of the acquired image feature, and acquires the product information from the storage unit on the producer side of the product on the basis of the acquired identification information about the component.

(Supplementary Note 47)

The program described in any one of the supplementary notes 44 to 46, wherein the product information includes at least one or more information of the identification information for identifying the producer, the identification information for identifying the product produced by the producer, the identification information for identifying an individual of the product, distribution course information indicating a distribution course of the component or the product, and the verification information about the verification of the product.

(Supplementary Note 48)

The program described in any one of the supplementary notes 44 to 47, wherein the registering means registers the verification information about the verification upon performing the verification by using the image feature in the storage unit as the product information in association with the acquired image feature, and has an analyzing means that performs statistical processing of the registered verification information and analyzes generation conditions of an imitation product.

(Supplementary Note 49)

The program described in any one of the supplementary notes 44 to 48, wherein the registration unit registers the distribution course of information about a component having the image feature or a product on which a component having the image feature is fixed in the storage unit as the product information in association with the acquired image feature, and has an analyzing means that performs statistical processing of the registered distribution course information and analyzes at least one of the distribution course, selling conditions, and usage conditions of the predetermined component or the product.

(Supplementary Note 50)

The program described in the supplementary note 47 or 49, wherein the predetermined area is a concave portion of the component.

(Supplementary Note 51)

The program described in any one of the supplementary notes 43 to 50, wherein the image feature of the component is a pattern in a predetermined area generated in a process in which the component is fabricated.

(Supplementary Note 52)

The program described in the supplementary note 51, wherein the pattern is a textured pattern that is provided to the component.

(Supplementary Note 53)

The program described in any one of the supplementary notes 43 to 52, wherein the component is at least any one of a fastener, a screw, a nail, a nut, and an electronic component.

(Supplementary Note 54)

The program described in the supplementary note 53, wherein the fastener is at least any one of a slide fastener, a hook and loop fastener, a snap fastener, a rail fastener, a buckle, a cord stopper, a belt adjuster, a loop clutch, a snap button, and a button.

(Supplementary Note 55)

The program described in any one of the supplementary notes 43 to 54, wherein the component is any material of leather, metal, plastics, pottery, ceramics, and resins.

(Supplementary Note 56)

The verification method described in any one of the supplementary notes 43 to 55, where the textured pattern is intentionally provided to a product for identification or verification.

This application is based upon and claims the benefit of priority of the prior Japanese Patent Application No. 2012-140355, filed on Jun. 22, 2012, the entire contents of which are incorporated herein by reference.

REFERENCE SIGNS LIST

1 Verification system
2 Cell-phone
11 Image feature database
12 Verification apparatus
13 Product information database
14 Registration device
15 Distribution information database
201 Determination unit
202 Image feature extraction unit
203 Registration unit
204 Authentication unit

The invention claimed is:

1. A verification method comprising:
acquiring an image feature of a verification area of a component in a product to be verified;
verifying product information of the product to be verified with product information stored in a storage on a producer side of the product, the product information comprising product identification information, based on the acquired image feature of the verification area of the component and an image feature stored in a storage on a supplier side of the component, wherein
the image feature stored in the storage on the supplier side is of a textured pattern provided by a mold in at least a part of the verification area in a predetermined area of the component, wherein a random pattern was generated on the textured pattern by applying a process of blasting, texture processing using powder painting, or plating, and the image feature stored in the storage on the supplier side is associated with identification information of the component, wherein the identification information of the component is associated with the product information in the storage on the producer side, and acquiring, for verification, the identification information about the component from the storage on the supplier side of the component based on the acquired image feature, and acquiring the product information from the storage on the producer side of the product based on the acquired identification information about the component.

2. The verification method according to claim 1, wherein the product information stored in the storage on the producer side is associated with image features of the textured patterns provided by the same mold in at least a part of the verification area of at least one component of a plurality of components provided by the same mold, as a representative value.

3. A verification system comprising:
a storage on a supplier side of a component in a product to be verified;
a storage on a producer side of the product to be verified; and
a processor programmed to:
acquire an image feature of a verification area of the component in the product to be verified;
verify product information of the product to be verified with product information stored in the storage on the producer side, the product information comprising product identification information, based on the acquired image feature of the verification area of the component and an image feature stored in the-storage on the supplier side, wherein
the image feature stored in the storage on the supplier side is of a textured pattern provided by a mold in at least a part of the verification area in a predetermined area of the component, wherein a random pattern was generated on the textured pattern by applying a process of blasting, texture processing using powder painting, or plating, and
the image feature stored in the storage on the supplier side is associated with identification information of the component, wherein
the identification information of the component is associated with the product information in the storage on the producer side, and
the processor is programmed to acquire, for verification, the identification information about the component from the storage on the supplier side of the component based on the acquired image feature, and acquire the product information from the storage on the producer side of the product based on the acquired identification information about the component.

4. The verification system according to claim 3, wherein the product information includes at least one or more information of identification information for identifying the producer, identification information for identifying the product produced by the producer, identification information for identifying an individual of the product, distribution course information indicating a distribution course of the component or the product, and verification information about the verification of the product.

5. The verification system according to claim 3, wherein the predetermined area is a concave portion of the component.

6. The verification system according to claim 3, wherein the textured pattern in the predetermined area is generated in a process in which the component is fabricated.

7. The verification system according to claim 3, wherein the component is at least any one of a fastener, a screw, a nail, a nut, and an electronic component.

8. The verification system according to claim 7, wherein the fastener is at least any one of a slide fastener, a hook and loop fastener, a snap fastener, a rail fastener, a buckle, a cord stopper, a belt adjuster, a loop clutch, a snap button, and a button.

9. The verification system according to claim 3, wherein the component is any material of leather, metal, plastics, pottery, ceramics, and resins.

10. The verification system according to claim 3, wherein the processor is further programmed to register, for the verification, one or both of the product information about the product to be verified in the storage on the producer side and verification information in the storage on the supplier side in association with the acquired image feature.

11. The verification system according to claim 10, wherein the processor is further programmed to perform statistical processing of the registered verification information and analyze generation conditions of an imitation product.

12. The verification system according to claim 11, wherein the the processor is programmed to:
register distribution course of information either about a component having the image feature or about a product on which a component having the image feature is fixed in the storage on the producer side as the product information in association with the identification information about the component, and
perform statistical processing of the registered distribution course information and analyze at least one of the distribution course, selling conditions, and usage conditions of the predetermined component or the product.

13. A verification apparatus comprising:
a processor programmed to:
verify product information of a product to be verified with product information stored in a storage on a producer side of the product, the product information comprising product identification information, based on an acquired image feature of a verification area of a component in the product to be verified and an image feature stored in a storage on a supplier side of the component, wherein
the image feature stored in the storage on the supplier side is of a textured pattern provided by a mold in at least a part of the verification area in a predetermined area of the component, wherein a random pattern was generated on the textured pattern by applying a process of blasting, texture processing using powder painting, or plating, and
the image feature stored in the storage on the supplier side is associated with identification information of the component, wherein
the identification information of the component is associated with the product information in the storage on the producer side, and the processor is programmed to acquire, for verification, the identification information about the component from the storage on the supplier side of the component based on the acquired image feature, and acquire the product information from the storage on the producer side of the product based on the acquired identification information about the component.

14. The verification apparatus according to claim 13, wherein the processor is further programmed to register, for the verification, one or both of the product information about the product to be verified in the storage on the producer side and verification information in the storage on the supplier side in association with the acquired image feature.

15. The verification apparatus according to claim 13, wherein the product information includes at least one or more information of identification information for identifying the producer, identification information for identifying the product produced by the producer, identification information for identifying an individual of the product, distribution course information indicating a distribution course of the component or the product, and verification information about the verification of the product.

16. A non-transitory computer readable storage medium storing a program for a verification apparatus, the program causing a computer to:

verify product information of a product to be verified with product information stored in a storage on a producer side of the product, the product information comprising product identification information, based on an acquired image feature of a verification area of a component in the product to be verified and an image feature stored in a storage on a supplier side of the component, wherein the image feature stored in the storage on the supplier side is of a textured pattern provided by a mold in at least a part of the verification area in a predetermined area of the component, wherein a random pattern was generated on the textured pattern by applying a process of blasting, texture processing using powder painting, or plating, and the image feature stored in the storage on the supplier side is associated with identification information of the component, wherein the identification information of the component is associated with the product information in the storage on the producer side, and the program causes the computer to acquire, for verification, the identification information about the component from the storage on the supplier side of the component based on the acquired image feature, and acquire the product information from the storage on the producer side of the product based on the acquired identification information about the component.

* * * * *